(12) United States Patent
Huang

(10) Patent No.: US 11,099,355 B2
(45) Date of Patent: Aug. 24, 2021

(54) CAMERA LENS ASSEMBLY

(71) Applicant: Zhejiang Sunny Optical Co., Ltd, Ningbo (CN)

(72) Inventor: Lin Huang, Ningbo (CN)

(73) Assignee: ZHEJIANG SUNNY OPTICAL CO., LTD, Ningbo (CN)

(*) Notice: Subject to any disclaimer, the term of this patent is extended or adjusted under 35 U.S.C. 154(b) by 351 days.

(21) Appl. No.: 16/224,539

(22) Filed: Dec. 18, 2018

(65) Prior Publication Data
US 2019/0121059 A1  Apr. 25, 2019

Related U.S. Application Data

(63) Continuation of application No. PCT/CN2018/080108, filed on Mar. 23, 2018.

(30) Foreign Application Priority Data

Sep. 13, 2017 (CN) .......................... 201710820224.0
Sep. 13, 2017 (CN) .......................... 201721167409.8

(51) Int. Cl.
G02B 9/34   (2006.01)
G02B 9/58   (2006.01)
G02B 13/00  (2006.01)
G02B 13/06  (2006.01)

(52) U.S. Cl.
CPC ............. *G02B 9/58* (2013.01); *G02B 13/004* (2013.01); *G02B 13/06* (2013.01)

(58) Field of Classification Search
CPC ........ G02B 9/58; G02B 13/004; G02B 13/06; G02B 9/34
See application file for complete search history.

(56) References Cited

U.S. PATENT DOCUMENTS

| 8,089,698 B1 | 1/2012 | Tang et al. |
| 8,416,510 B2 | 4/2013 | Kubota et al. |
| 9,658,430 B2 | 5/2017 | Chen et al. |
| 9,864,169 B2 | 1/2018 | Liu et al. |
| 2012/0154905 A1 | 6/2012 | Tsai |
| 2014/0098432 A1* | 4/2014 | Kubota ................ G02B 13/004 359/781 |
| 2017/0003476 A1 | 1/2017 | Liu et al. |

FOREIGN PATENT DOCUMENTS

| CN | 106324802 |   | 1/2017 |   |
| CN | 106842549 | * | 6/2017 | ............. G02B 23/24 |
| CN | 107422459 |   | 12/2017 |   |
| CN | 207123647 |   | 3/2018 |   |

* cited by examiner

Primary Examiner — Joseph P Martinez
(74) Attorney, Agent, or Firm — Hauptman Ham, LLP

(57) ABSTRACT

The present disclosure discloses a camera lens assembly. The camera lens assembly includes, sequentially along an optical axis from an object side to an image side: a first lens, a second lens, a third lens, and a fourth lens. The first lens has a negative refractive power. The third lens has a positive refractive power. The second lens and the fourth lens both have refractive powers. An object-side surface of the third lens is a convex surface, an image-side surface of the fourth lens is a concave surface, and a radius of curvature R5 of the object-side surface of the third lens and a radius of curvature R8 of the image-side surface of the fourth lens satisfy: 0.7<R5/R8<1.2.

19 Claims, 9 Drawing Sheets

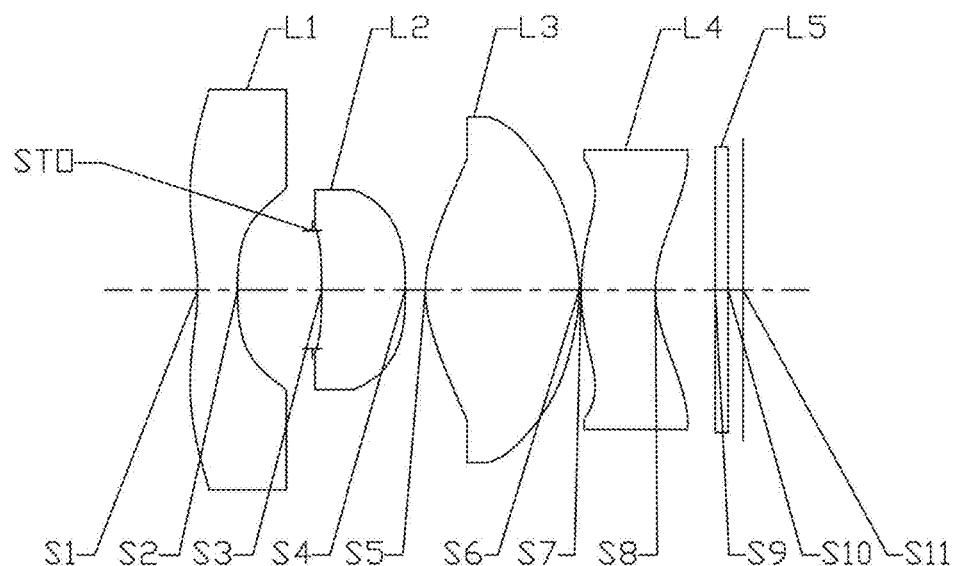
Fig. 1
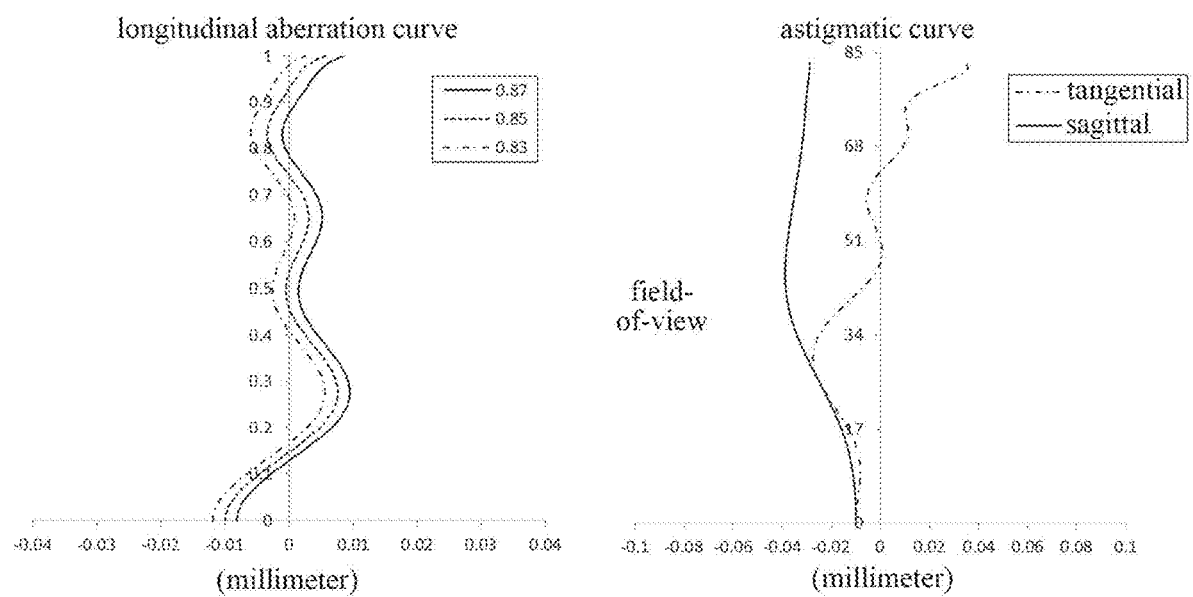
Fig. 2A                    Fig. 2B

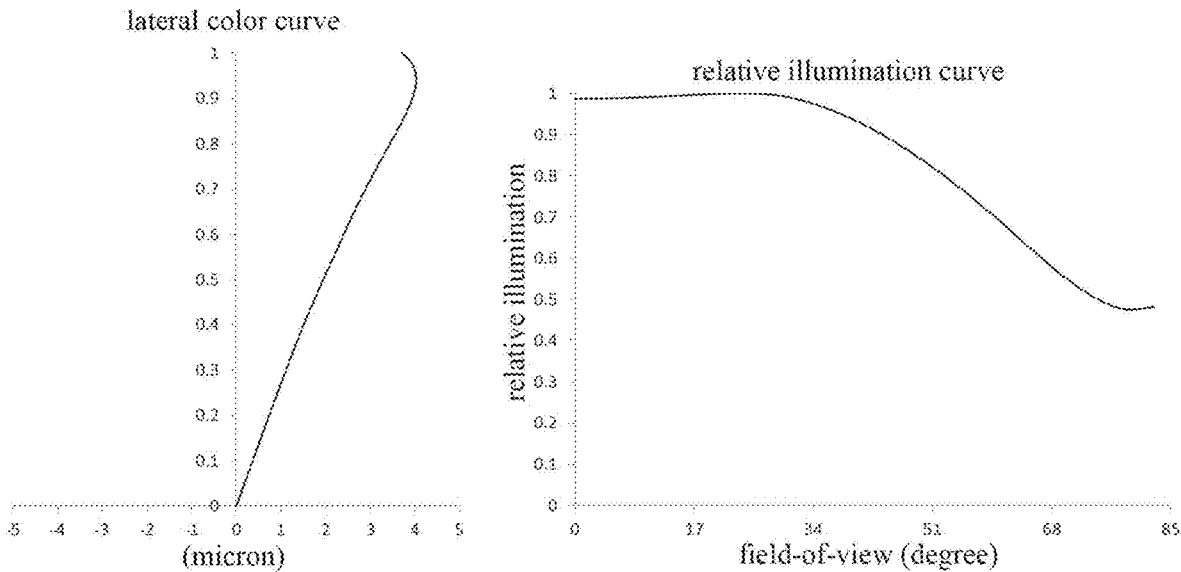
Fig. 6C
Fig. 6D
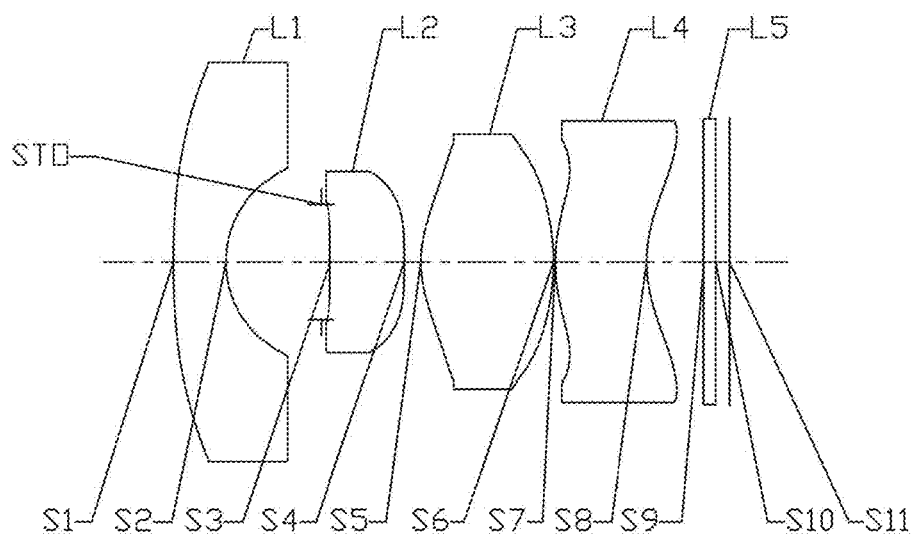
Fig. 7

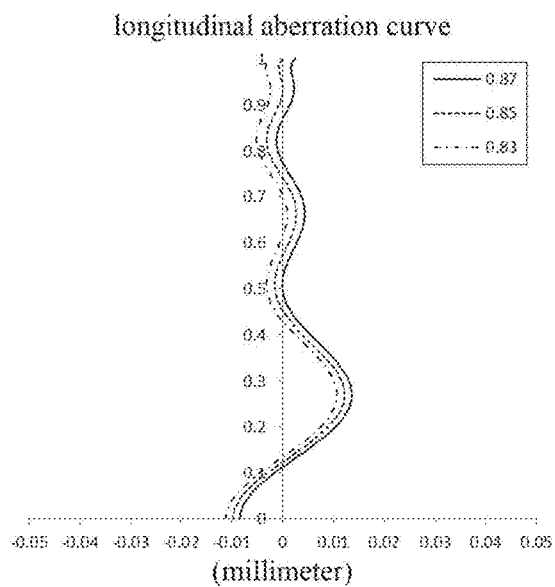
Fig. 8A
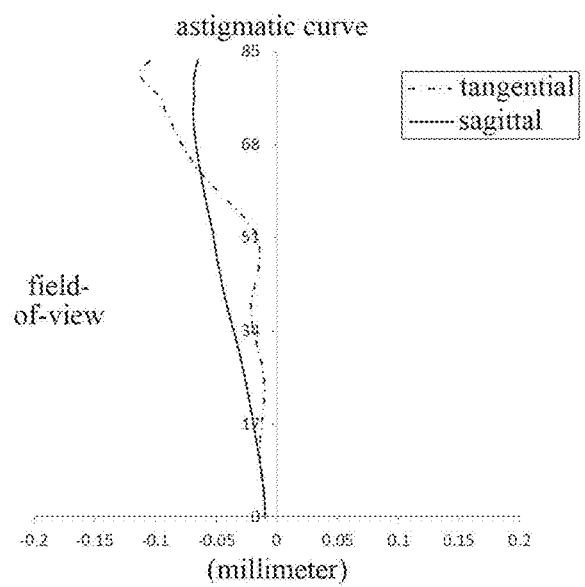
Fig. 8B
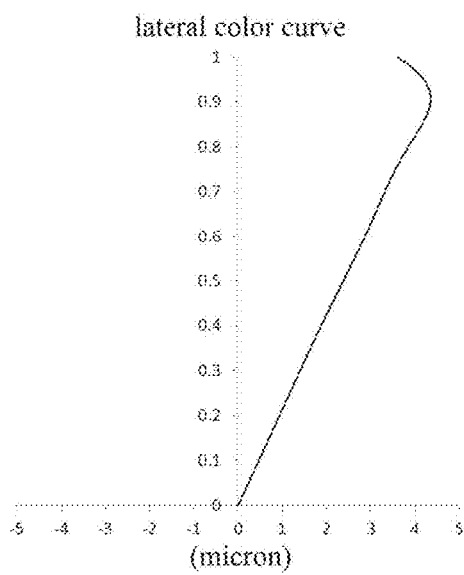
Fig. 8C
Fig. 8D

Fig. 10C                        Fig. 10D

CAMERA LENS ASSEMBLY

CROSS-REFERENCE TO RELATED APPLICATIONS

This application is a continuation of International Application No. PCT/CN2018/080108, filed on Mar. 23, 2018, which claims the priorities and rights to Chinese Patent Application No. 201710820224.0 and Chinese Patent Application No. 201721167409.8 filed with the China National Intellectual Property Administration (CNIPA) on Sep. 13, 2017. All of the aforementioned applications are hereby incorporated by reference in their entireties.

TECHNICAL FIELD

The present disclosure relates to a camera lens assembly, and more specifically to a camera lens assembly including four lenses.

BACKGROUND

As the improving in performance and reducing in size of the often used photosensitive elements such as charge-coupled device elements (CCD) or complementary metal-oxide semiconductor elements (CMOS), higher requirements have been put forward on the high imaging quality and miniaturization of the counterpart camera lens assemblies.

To satisfy the requirement of miniaturization, a typical configuration of the existing camera lens assembly has an F-number Fno (total effective focal length of the lens assembly/entrance pupil diameter of the lens assembly) of 2.0 or above, to possess good optical performance while achieving miniaturization. However, the continuously development of portable electronic products such as smart phones puts forward higher requirements on the counterpart camera lens assemblies. Especially in situations such as insufficient lighting (e.g., cloudy and rainy days, or at dusk) or hand trembling, the camera lens assembly having the F-number Fno of 2.0 or above is unable to meet the higher imaging requirements.

In particular, as applications of laser range detection cameras develop, the requirements on camera lens assemblies suitable for the laser range detection cameras are higher and higher. The lens assemblies of the range detection cameras in general have large sizes and cannot meet the miniaturization requirement, while the conventional small-size lens assemblies have small apertures and cannot be used on the range detection cameras. Therefore, a lens assembly is required to meet the requirements of both large aperture and miniaturization while ensuring the imaging quality.

SUMMARY

The present disclosure provides a camera lens assembly that may be applicable to portable electronic products and may at least solve or partially solve at least one of the above disadvantages in the existing technology, such as a wide-angle lens assembly.

According to an aspect, the present disclosure provides a camera lens assembly. The camera lens assembly includes, sequentially along an optical axis from an object side to an image side: a first lens, a second lens, a third lens, and a fourth lens. The first lens may have a negative refractive power. The third lens may have a positive refractive power. Each of the second lens and the fourth lens has a refractive power. An object-side surface of the third lens may be a convex surface, an image-side surface of the fourth lens may be a concave surface, and a radius of curvature R5 of the object-side surface of the third lens and a radius of curvature R8 of the image-side surface of the fourth lens may satisfy: $0.7 < R5/R8 < 1.2$.

In an implementation, an effective focal length f1 of the first lens and a total effective focal length f of the camera lens assembly may satisfy: $-3 < f1/f < -1.5$.

In an implementation, a center thickness CT1 of the first lens on the optical axis, a center thickness CT2 of the second lens on the optical axis and a center thickness CT3 of the third lens on the optical axis may satisfy: $0.9 < CT3/(CT1+CT2) < 1.5$.

In an implementation, a spacing distance T12 between the first lens and the second lens on the optical axis and a distance TTL from an object-side surface of the first lens to an image plane of the camera lens assembly on the optical axis may satisfy: $0.1 < T12/TTL < 0.3$.

In an implementation, a spacing distance T23 between the second lens and the third lens on the optical axis and a distance TTL from an object-side surface of the first lens to an image plane of the camera lens assembly on the optical axis may satisfy: $0.1 < T23*10/TTL < 0.6$.

In an implementation, half of a diagonal length ImgH of an effective pixel area on the image plane of the camera lens assembly and the total effective focal length f of the camera lens assembly may satisfy: $1 < ImgH/f < 1.5$.

In an implementation, an effective semi-diameter DT11 of an object-side surface of the first lens and an effective semi-diameter DT42 of the image-side surface of the fourth lens may satisfy: $1.3 < DT11/DT42 < 1.8$.

In an implementation, the effective semi-diameter DT11 of the object-side surface of the first lens and half of a diagonal length ImgH of an effective pixel area on an image plane of the camera lens assembly may satisfy: $1.2 < DT11/ImgH < 1.7$.

In an implementation, the effective semi-diameter DT42 of the image-side surface of the fourth lens and half of a diagonal length ImgH of an effective pixel area on an image plane of the camera lens assembly may satisfy: $0.7 < DT42/ImgH < 1$.

In an implementation, an effective semi-diameter DT32 of an image-side surface of the third lens and an effective semi-diameter DT41 of an object-side surface of the fourth lens may satisfy: $0.9 < DT32/DT41 < 1.4$.

In an implementation, a distance SAG42 on the optical axis from an intersection point of the image-side surface of the fourth lens and the optical axis to an effective semi-diameter vertex of the image-side surface of the fourth lens and a center thickness CT4 of the fourth lens on the optical axis may satisfy: $0 < SAG42/CT4 < 0.8$.

According to another aspect, the present disclosure further provides a camera lens assembly. The camera lens assembly includes, sequentially along an optical axis from an object side to an image side: a first lens, a second lens, a third lens, and at least one subsequent lens. At least one of an object-side surface and an image-side surface of the first lens may be a concave surface. At least one of an object-side surface and an image-side surface of the second lens may be a convex surface. An object-side surface and an image-side surface of the third lens may both be convex surfaces. A center thickness CT1 of the first lens on the optical axis, a center thickness CT2 of the second lens on the optical axis and a center thickness CT3 of the third lens on the optical axis may satisfy: $0.9 < CT3/(CT1+CT2) < 1.5$.

In an implementation, the at least one subsequent lens may include a fourth lens between the third lens and the image side, and an image-side surface of the fourth lens may be a concave surface.

According to another aspect, the present disclosure further provides a camera lens assembly. The camera lens assembly includes, sequentially along an optical axis from an object side to an image side: a first lens, a second lens, a third lens, and a fourth lens. The first lens may have a negative refractive power. The second lens may have a positive refractive power or a negative refractive power. The third lens may have a positive refractive power. The fourth lens may have a negative refractive power. Half of a diagonal length ImgH of an effective pixel area on an image plane of the camera lens assembly and a total effective focal length f of the camera lens assembly may satisfy: $1<\text{ImgH}/f<1.5$.

According to another aspect, the present disclosure further provides a camera lens assembly. The camera lens assembly includes, sequentially along an optical axis from an object side to an image side: a first lens, a second lens, a third lens, and a fourth lens. The first lens may have a negative refractive power. The second lens may have a positive refractive power or a negative refractive power. The third lens may have a positive refractive power, and an object-side surface of the third lens is a convex surface. The fourth lens has a positive refractive power or a negative refractive power, and an image-side surface of the fourth lens is a concave surface. An effective focal length f1 of the first lens and a total effective focal length f of the camera lens assembly may satisfy: $-3<f1/f<-1.5$.

According to another aspect, the present disclosure further provides a camera lens assembly. The camera lens assembly includes, sequentially along an optical axis from an object side to an image side: a first lens, a second lens, a third lens, and a fourth lens. The first lens may have a negative refractive power. The second lens may have a positive refractive power or a negative refractive power. The third lens may have a positive refractive power, and an object-side surface of the third lens is a convex surface. The fourth lens has a positive refractive power or a negative refractive power, and an image-side surface of the fourth lens is a concave surface. An effective semi-diameter DT11 of an object-side surface of the first lens and an effective semi-diameter DT42 of the image-side surface of the fourth lens may satisfy: $1.3<\text{DT11}/\text{DT42}<1.8$.

According to another aspect, the present disclosure further provides a camera lens assembly. The camera lens assembly includes, sequentially along an optical axis from an object side to an image side: a first lens, a second lens, a third lens, and a fourth lens. The first lens may have a negative refractive power. The second lens may have a positive refractive power or a negative refractive power. The third lens may have a positive refractive power, and an object-side surface of the third lens is a convex surface. The fourth lens has a positive refractive power or a negative refractive power, and an image-side surface of the fourth lens is a concave surface. An effective semi-diameter DT11 of an object-side surface of the first lens and half of a diagonal length ImgH of an effective pixel area on an image plane of the camera lens assembly may satisfy: $1.2<\text{DT11}/\text{ImgH}<1.7$.

According to another aspect, the present disclosure further provides a camera lens assembly. The camera lens assembly includes, sequentially along an optical axis from an object side to an image side: a first lens, a second lens, a third lens, and a fourth lens. The first lens may have a negative refractive power. The second lens may have a positive refractive power or a negative refractive power. The third lens may have a positive refractive power, and an object-side surface of the third lens is a convex surface. The fourth lens has a positive refractive power or a negative refractive power, and an image-side surface of the fourth lens is a concave surface. A spacing distance T12 between the first lens and the second lens on the optical axis and a distance TTL from an object-side surface of the first lens to an image plane of the camera lens assembly on the optical axis may satisfy: $0.1<\text{T12}/\text{TTL}<0.3$.

According to another aspect, the present disclosure further provides a camera lens assembly. The camera lens assembly includes, sequentially along an optical axis from an object side to an image side: a first lens, a second lens, a third lens, and a fourth lens. The first lens may have a negative refractive power. The second lens may have a positive refractive power or a negative refractive power. The third lens may have a positive refractive power, and an object-side surface of the third lens is a convex surface. The fourth lens has a positive refractive power or a negative refractive power, and an image-side surface of the fourth lens is a concave surface. A spacing distance T23 between the second lens and the third lens on the optical axis and a distance TTL from an object-side surface of the first lens to an image plane of the camera lens assembly on the optical axis may satisfy: $0.1<\text{T23}*10/\text{TTL}<0.6$.

According to another aspect, the present disclosure further provides a camera lens assembly. The camera lens assembly includes, sequentially along an optical axis from an object side to an image side: a first lens, a second lens, a third lens, and a fourth lens. The first lens may have a negative refractive power. The second lens may have a positive refractive power or a negative refractive power. The third lens may have a positive refractive power, and an object-side surface of the third lens is a convex surface. The fourth lens has a positive refractive power or a negative refractive power, and an image-side surface of the fourth lens is a concave surface. An effective semi-diameter DT32 of an image-side surface of the third lens and an effective semi-diameter DT41 of an object-side surface of the fourth lens may satisfy: $0.9<\text{DT32}/\text{DT41}<1.4$.

According to another aspect, the present disclosure further provides a camera lens assembly. The camera lens assembly includes, sequentially along an optical axis from an object side to an image side: a first lens, a second lens, a third lens, and a fourth lens. The first lens may have a negative refractive power. The second lens may have a positive refractive power or a negative refractive power. The third lens may have a positive refractive power, and an object-side surface of the third lens is a convex surface. The fourth lens has a positive refractive power or a negative refractive power, and an image-side surface of the fourth lens is a concave surface. An effective semi-diameter DT42 of an image-side surface of the fourth lens and half of a diagonal length ImgH of an effective pixel area on an image plane of the camera lens assembly may satisfy: $0.7<\text{DT42}/\text{ImgH}<1$.

According to another aspect, the present disclosure further provides a camera lens assembly. The camera lens assembly includes, sequentially along an optical axis from an object side to an image side: a first lens, a second lens, a third lens, and a fourth lens. The first lens may have a negative refractive power. The second lens may have a positive refractive power or a negative refractive power. The third lens may have a positive refractive power, and an object-side surface of the third lens is a convex surface. The fourth lens has a positive refractive power or a negative refractive power, and an image-side surface of the fourth lens is a concave surface. A distance SAG42 on the optical axis from an intersection point of an image-side surface of the fourth lens and the optical axis to an effective semi-diameter vertex of the image-side surface of the fourth lens and a center thickness CT4 of the fourth lens on the optical axis may satisfy: 0<SAG42/CT4<0.8.

By properly distributing the refractive powers and the surface types of the lenses, the center thicknesses of the lenses, the axial spacing distances between the lenses, etc., the camera lens assembly has at least one of the beneficial effects of miniaturization, large aperture or high brightness, while achieving a good imaging quality.

BRIEF DESCRIPTION OF THE DRAWINGS

By describing non-limiting implementations below in detail with reference to the accompanying drawings, other features, objectives and advantages of the present disclosure will be more apparent. In the accompanying drawings:

FIG. 1 is a schematic structural diagram illustrating a camera lens assembly according to Embodiment 1 of the present disclosure;

FIGS. 2A-2D respectively illustrate a longitudinal aberration curve, an astigmatic curve, a lateral color curve, and a relative illumination curve of the camera lens assembly according to Embodiment 1;

FIGS. 6A-6D respectively illustrate a longitudinal aberration curve, an astigmatic curve, a lateral color curve, and a relative illumination curve of the camera lens assembly according to Embodiment 3;

FIG. 7 is a schematic structural diagram illustrating a camera lens assembly according to Embodiment 4 of the present disclosure;

FIGS. 8A-8D respectively illustrate a longitudinal aberration curve, an astigmatic curve, a lateral color curve, and a relative illumination curve of the camera lens assembly according to Embodiment 4;

FIGS. 10A-10D respectively illustrate a longitudinal aberration curve, an astigmatic curve, a lateral color curve, and a relative illumination curve of the camera lens assembly according to Embodiment 5;

DETAILED DESCRIPTION OF EMBODIMENTS

Figure 2C:
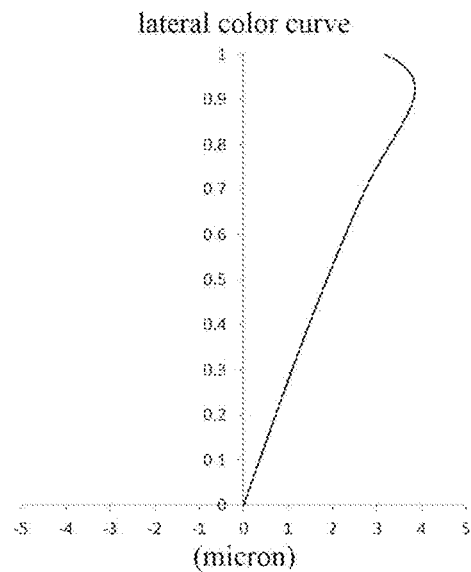

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first,", "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In this text, the paraxial area refers to an area near the optical axis. If the surface of a lens is a convex surface and the position of the convex surface is not defined, it indicates that the surface of the lens is a convex surface at least in the paraxial area; and if the surface of a lens is a concave surface and the position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The features, principles, and other aspects of the present disclosure are described in detail below.

The camera lens assembly according to exemplary implementations of the present disclosure includes, for example, four lenses having refractive powers (i.e., a first lens, a second lens, a third lens, and a fourth lens). The four lenses are sequentially arranged from the object side to the image side along the optical axis. The camera lens assembly may further include a photosensitive element disposed on an image plane.

The first lens may have a negative refractive power. The second lens may have a positive refractive power or a negative refractive power. The third lens may have a positive refractive power. The fourth lens has a positive refractive power or a negative refractive power.

Alternatively, the fourth lens may have a negative refractive power.

An effective focal length f1 of the first lens and a total effective focal length f of the camera lens assembly may satisfy: $-3<f1/f<-1.5$, and more specifically, f1 and f may further satisfy: $-2.62 \le f1/f \le 1.86$. Properly configuring the refractive power of the first lens may effectively enlarge the field-of-view of the lens assembly.

A spacing distance T12 between the first lens and the second lens on the optical axis and a total track length TTL of the camera lens assembly (i.e., a distance from an object-side surface of the first lens to the image plane of the camera lens assembly on the optical axis) may satisfy: $0.1<T12/TTL<0.3$, and more specifically, T12 and TTL may further satisfy: $0.15 \le T12/TTL \le 0.22$. By properly configuring T12 and TTL, it is possible to improve the relative illumination and the aperture effect of the lens assembly while achieving a large wide-angle.

A spacing distance T23 between the second lens and the third lens on the optical axis and the total track length TTL of the camera lens assembly may satisfy: $0.1<T23*10/TTL<0.6$, and more specifically, T23 and TTL may further satisfy: $0.28 \le T23*10/TTL \le 0.51$. By properly configuring T23 and TTL, it is beneficial to improve the resolution of the lens assembly. At the same time, it is also beneficial to ensure that the lens assembly has a shorter total track length, achieving miniaturization of the lens assembly.

A center thickness CT1 of the first lens on the optical axis, a center thickness CT2 of the second lens on the optical axis and a center thickness CT3 of the third lens on the optical axis may satisfy: $0.9<CT3/(CT1+CT2)<1.5$, and more specifically, CT1, CT2 and CT3 may further satisfy: $1.01 \le CT3/(CT1+CT2) \le 1.49$. By properly configuring the center thicknesses of the first lens, the second lens, and the third lens, it is conductive to achieving a miniaturization effect.

An object-side surface of the third lens may be a convex surface, and an image-side surface of the fourth lens may be a concave surface. A radius of curvature R5 of the object-side surface of the third lens and a radius of curvature R8 of the image-side surface of the fourth lens may satisfy: $0.7<R5/R8<1.2$, and more specifically, R5 and R8 may further satisfy: $0.80 \le R5/R8 \le 1.07$. By properly controlling the radius of curvature of each surface of the third lens and each surface of the fourth lens, it is beneficial to the correction of various types of aberrations, and is advantageous for improving the imaging quality of the lens assembly.

Alternatively, at least one of the object-side surface and the image-side surface of the first lens may be a concave surface. At least one of the object-side surface and the image-side surface of the second lens may be a convex surface. The object-side surface of the third lens may be a convex surface, and the image-side surface of the third lens may be a convex surface. The object-side surface of the fourth lens may be a convex surface, and the image-side surface of the fourth lens may be a concave surface.

An effective semi-diameter DT11 of the object-side surface of the first lens and an effective semi-diameter DT42 of the image-side surface of the fourth lens may satisfy: $1.3<DT11/DT42<1.8$, and more specifically, DT11 and DT42 may further satisfy: $1.42 \le DT11/DT42 \le 1.69$, to achieve the miniaturization effect.

The effective semi-diameter DT11 of the object-side surface of the first lens and half of a diagonal length ImgH of an effective pixel area on an image plane of the camera lens assembly may satisfy: $1.2<DT11/ImgH<1.7$, and more specifically, DT11 and ImgH may further satisfy: $1.33 \le DT11/ImgH \le 1.54$, to achieve the miniaturization effect.

The effective semi-diameter DT42 of the image-side surface of the fourth lens and the half of the diagonal length ImgH of the effective pixel area on the image plane of the camera lens assembly may satisfy: $0.7<DT42/ImgH<1$, and more specifically, DT42 and ImgH may further satisfy: $0.89 \le DT42/ImgH \le 0.98$, to improve the relative illumination of the lens assembly.

An effective semi-diameter DT32 of the image-side surface of the third lens and an effective semi-diameter DT41 of the object-side surface of the fourth lens may satisfy: $0.9<DT32/DT41<1.4$, and more specifically, DT32 and DT41 may further satisfy: $1.00 \le DT32/DT41 \le 1.33$, to improve the resolution of the lens assembly.

A distance SAG42 on the optical axis from an intersection point of the image-side surface of the fourth lens and the optical axis to an effective semi-diameter vertex of the image-side surface of the fourth lens and a center thickness CT4 of the fourth lens on the optical axis may satisfy: $0<SAG42/CT4<0.8$, and more specifically, SAG42 and CT4 may further satisfy: $0.31 \le SAG42/CT4 \le 0.64$. By properly configuring SAG42 and CT4, it is beneficial to reduce the distortion and improve the imaging quality of the lens assembly.

The half of the diagonal length ImgH of the effective pixel area on the image plane of the camera lens assembly and the total effective focal length f of the camera lens assembly may satisfy: $1<ImgH/f<1.5$, and more specifically, ImgH and f may further satisfy: $1.17 \le ImgH/f \le 1.34$.

In an exemplary implementation, the camera lens assembly may also provide at least one diaphragm, for improving the imaging quality of the lens assembly. The diaphragm, may be disposed at any position between the object side and the image side as needed.

Alternatively, the camera lens assembly may further include at least one of an optical filter for correcting the color deviation or a cover glass for protecting the photosensitive element on the image plane.

The camera lens assembly according to the above implementations of the present disclosure may use multiple lenses, for example, four lenses as described in the preceding text. By properly allocating the refractive power and surface type of each lens, the center thickness of each lens and the axial spacing distance between the lenses, etc., it is possible to effectively reduce the size of the lens assembly, reduce the system sensibility, and improve the processibility of the lens assembly, thus making the camera lens assembly more conducive to the production and processing and may be applicable to portable electronic products. At the same time, the camera lens assembly configured as above also has advantageous effects such as large aperture, high brightness, and high imaging quality, and can be preferably applied to fields such as distance detection.

In the implementations of the present disclosure, at least one of the surfaces of the each lens is an aspheric mirror surface. The characteristic of the aspheric lens is: from the center of the lens to the periphery, the curvature is continuously changing. Unlike the spherical lens with a constant curvature from the center of the lens to the periphery, the aspheric lens has a better radius-of-curvature characteristic, having advantages of improving the distortion aberration and improving the astigmatic: aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the camera lens assembly without departing from the technical solution claimed by the present disclosure. For example, although the camera lens assembly having four lenses is described as an example in the implementations, the camera lens assembly is not limited to include four lenses. If desired, the camera lens assembly may also include other numbers of lenses.

Specific embodiments of the camera lens assembly that may be applied to the above implementations are further described below with reference to the accompanying drawings.

Embodiment 1

A camera lens assembly according to Embodiment 1 of the present disclosure is described below with reference to FIGS. 1-2D. FIG. 1 is a schematic structural diagram illustrating the camera lens assembly according to Embodiment 1 of the present disclosure.

As shown in FIG. 1, the camera lens assembly along an optical axis from an object side to an image side sequentially includes a first lens L1, a second lens L2, a third lens L3, a fourth lens L4 and an image plane S11. The camera lens assembly may further include a photosensitive element disposed on the image plane S11.

The first lens L1 has a negative refractive power, an object-side surface S1 of the first lens L1 is a concave surface, an image-side surface S2 of the first lens L1 is a concave surface, and the object-side surface S1 and the image-side surface S2 of the first lens L1 are both aspheric surfaces.

The second lens L2 has a positive refractive power, an object-side surface S3 of the second lens L2 is a concave surface, an image-side surface S4 of the second lens L2 is a convex surface, and the object-side surface S3 and the image-side surface S4 of the second lens L2 are both aspheric surfaces.

The third lens L3 has a positive refractive power, an object-side surface S5 of the third lens L3 is a convex surface, an image-side surface S6 of the third lens L3 is a convex surface, and the object-side surface S5 and the image-side surface S6 of the third lens L3 are both aspheric surfaces.

The fourth lens L4 has a negative refractive power, an object-side surface S7 of the fourth lens L4 is a convex surface, an image-side surface S8 of the fourth lens L4 is a concave surface, and the object-side surface S7 and the image-side surface S8 of the fourth lens L4 are both aspheric surfaces.

Alternatively, the camera lens assembly may further include an optical filter L5 having an object-side surface S9 and an image-side surface S10. Light from an object passes through the surfaces S1 to S10 sequentially and is finally imaged on the image plane S11.

Alternatively, an diaphragm STO may also be disposed between the first lens L1 and the second lens L2 to improve the imaging quality.

Table 1 shows the surface type, the radius of curvature, the thickness, the material and the conic coefficient of each lens of the camera lens assembly in Embodiment 1. The radius of curvature and the thickness are shown in millimeters (mm).

TABLE 1

| surface number | surface type | radius of curvature | thickness | refractive index | abbe number | conic coefficient |
|---|---|---|---|---|---|---|
| OBJ | spherical | infinite | infinite | | | |
| S1 | aspheric | −3.3375 | 0.6500 | 1.53 | 55.8 | −17.9615 |
| S2 | aspheric | 6.6251 | 1.2212 | | | 6.3792 |
| STO | spherical | infinite | 0.1525 | | | |
| S3 | aspheric | −17.5295 | 1.3747 | 1.53 | 55.8 | −6.9733 |
| S4 | aspheric | −9.6204 | 0.3287 | | | 26.9277 |
| S5 | aspheric | 1.9273 | 2.5097 | 1.53 | 55.8 | −6.6120 |
| S6 | aspheric | −2.7849 | 0.0300 | | | −7.9763 |
| S7 | aspheric | 3.4511 | 1.2218 | 1.62 | 23.5 | −1.1513 |
| S8 | aspheric | 1.8713 | 0.9759 | | | −4.4913 |
| S9 | spherical | infinite | 0.2100 | 1.52 | 64.2 | |
| S10 | spherical | infinite | 0.2446 | | | |
| S11 | spherical | infinite | | | | |

As may be obtained from Table 1, the radius of curvature R5 of the object-side surface S5 of the third lens L3 and the radius of curvature R8 of the image-side surface S8 of the fourth lens L4 satisfy: R5/R8=1.03. The center thickness CT1 of the first lens L1 on the optical axis, the center thickness CT2 of the second lens L2 on the optical axis and the center thickness CT3 of the third lens L3 on the optical axis satisfy: CT3/(CT1+CT2)=1.24.

In Embodiment 1, the aspheric lens may be used for each lens, and the surface type x of each aspheric surface is defined by the following formula:

$$x = \frac{ch^2}{1+\sqrt{1-(k+1)c^2h^2}} + \sum A_i h^i \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1 above); and Ai is the correction coefficient of the $i^{th}$ order of the aspheric surface. Table 2 below shows the high-order coefficients $A_4, A_6, A_8, A_{10}, A_{12}, A_{14}$, and $A_{16}$ applicable to the aspheric surfaces S1-S8 in Embodiment 1.

TABLE 2

| surface number | A4 | A6 | A8 | A10 | A12 | A14 | A16 |
|---|---|---|---|---|---|---|---|
| S1 | 3.0642E−02 | −7.2951E−03 | 1.2109E−03 | 1.2987E−04 | 8.2620E−06 | −2.7182E−07 | 3.1667E−09 |
| S2 | 1.1256E−01 | −7.4553E−02 | 1.1962E−01 | 1.1722E−01 | 6.4425E−02 | −1.7817E−02 | 1.8859E−03 |
| S3 | −9.6298E−02 | 3.2387E−01 | −1.1075E+00 | 2.0286E+00 | −2.1221E+00 | 1.1737E+00 | −2.6935E−01 |
| S4 | −1.4363E−01 | 1.1071E−01 | −1.1036E−01 | 7.7104E−02 | −3.4727E−02 | 8.7770E−03 | −9.6168E−04 |
| S5 | 8.5990E−03 | −7.0148E−04 | −1.1257E−03 | 5.2453E−04 | −1.1488E−04 | 1.3396E−05 | −6.6236E−07 |
| S6 | 8.6813E−03 | −3.2359E−03 | −2.5427E−03 | 1.2039E−03 | −2.2194E−04 | 2.0108E−05 | −7.5337E−07 |
| S7 | −7.4705E−03 | −4.1334E−03 | −6.6334E−04 | −1.7190E−05 | −3.6760E−06 | 2.0842E−05 | −3.0230E−06 |
| S8 | −1.5401E−02 | 1.3561E−02 | −8.0973E−03 | 2.4632E−03 | −2.8327E−04 | 1.6408E−05 | −2.8404E−07 |

Table 3 below shows the total effective focal length f of the camera lens assembly, the effective focal lengths f1-f4 of the lenses, the total track length TTL of the camera lens assembly (i.e., the distance on the optical axis from the center of the object-side surface S1 of the first lens L1 to the image plane S11) and the half of the diagonal length ImgH of the effective pixel area on the image plane S11 of the camera lens assembly in Embodiment 1.

TABLE 3

| | f | f1 | f2 | f3 | f4 | TTL | ImgH |
|---|---|---|---|---|---|---|---|
| parameter | (mm) | (mm) | (mm) | (mm) | (mm) | (mm) | (mm) |
| numerical value | 1.95 | −4.12 | 38.15 | 2.65 | −9.37 | 8.92 | 2.47 |

The spacing distance T12 between the first lens L1 and the second lens L2 on the optical axis and the total track length TTL of the camera lens assembly satisfy: T12/TTL=0.15. The spacing distance T23 between the second lens L2 and the third lens L3 on the optical axis and the total track length TTL of the camera lens assembly satisfy: T23*10/TTL=0.37. The effective focal length f1 of the first lens L1 and the total effective focal length f of the camera lens assembly satisfy: f1/f=−2.11. The half of the diagonal length ImgH of the effective pixel area on the image plane S11 of the camera lens assembly and the total effective focal length f of the camera lens assembly satisfy: ImgH/f=1.26.

In Embodiment 1, the effective semi-diameter DT11 of the object-side surface S1 of the first lens L1 and the effective semi-diameter DT42 of the image-side surface S8 of the fourth lens L4 satisfy: DT11/DT42=1.43. The effective semi-diameter DT11 of the object-side surface S1 of the first lens L1 and the half of the diagonal length ImgH of the effective pixel area on the image plane S11 of the camera lens assembly satisfy: DT11/ImgH=1.33. The effective semi-diameter DT42 of the image-side surface S8 of the fourth lens L4 and the half of the diagonal length ImgH of the effective pixel area on the image plane S11 of the camera lens assembly satisfy: DT42/ImgH=0.93. The effective semi-diameter DT32 of the image-side surface S6 of the third lens L3 and the effective semi-diameter DT41 of the object-side surface S7 of the fourth lens L4 satisfy: DT32/DT41=1.33. The distance SAG42 on the optical axis from the intersection point of the image-side surface S8 of the fourth lens L4 and the optical axis to the effective semi-diameter vertex of the image-side surface S8 of the fourth lens L4 and the center thickness CT4 of the fourth lens L4 on the optical axis satisfy: SAG42/CT4=0.43.

Figure 2D:
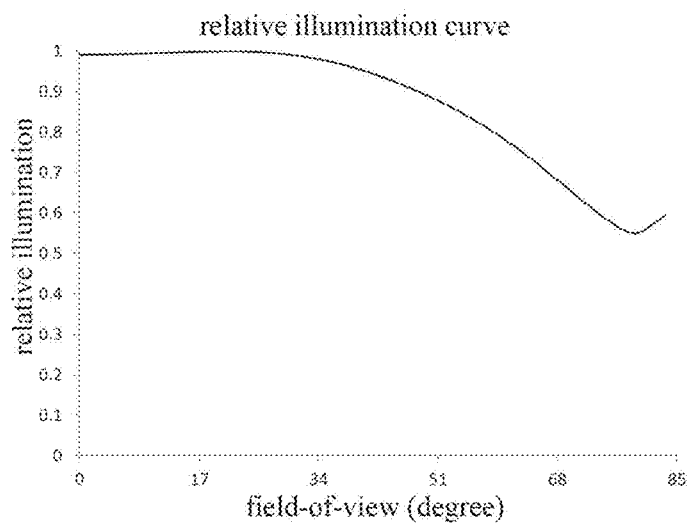

FIG. 2A shows the longitudinal aberration curve of the camera lens assembly according to Embodiment 1, representing deviations of focal points of light of different wavelengths converged after passing through the lens assembly. FIG. 2B shows the astigmatic curve of the camera lens assembly according to Embodiment 1, representing a curvature of the tangential image plane and a curvature of the sagittal image plane. FIG. 2C shows the lateral color curve of the camera lens assembly according to Embodiment 1, representing deviations of different image heights on the image plane after light passes through the lens assembly. FIG. 2D shows the relative illumination curve of the camera lens assembly according to Embodiment 1, representing the relative illuminations corresponding to different field-of-views. It can be seen from FIG. 2A to FIG. 2D that the camera lens assembly given in Embodiment 1 can achieve a good imaging quality.

Embodiment 2

Figure 3:
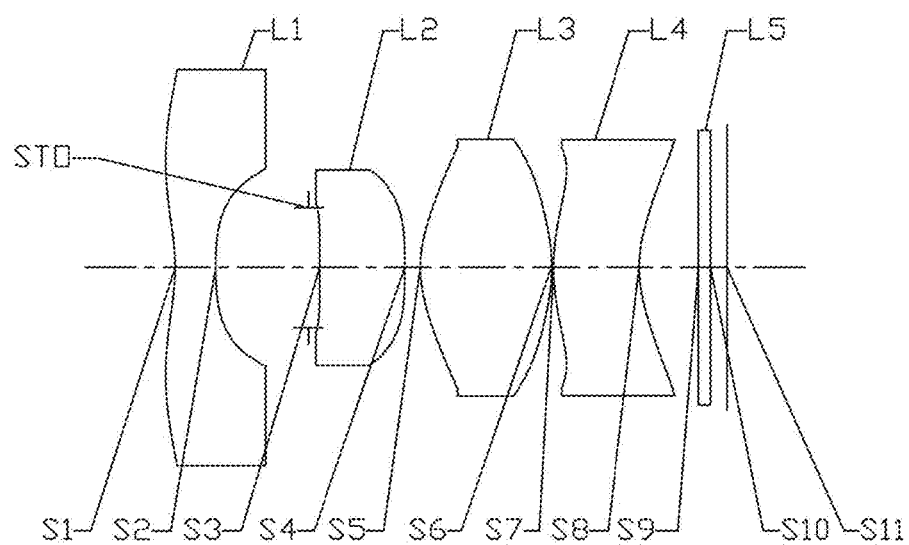
FIG. 3 is a schematic structural diagram illustrating a camera lens assembly according to Embodiment 2 of the present disclosure.

A camera lens assembly according to Embodiment 2 of the present disclosure is described below with reference to FIGS. 3-4D. In the present embodiment and the following embodiments, for the purpose of brevity, the description of parts similar to those in Embodiment 1 will be omitted. FIG. 3 is a schematic structural diagram illustrating the camera lens assembly according to Embodiment 2 of the present disclosure.

As shown in FIG. 3, the camera lens assembly along an optical axis from an object side to an image side sequentially includes a first lens L1, a second lens L2, a third lens L3, a fourth lens L4 and an image plane S11. The camera lens assembly may further include a photosensitive element disposed on the image plane S11.

The first lens L1 has a negative refractive power, an object-side surface S1 of the first lens L1 is a concave surface, an image-side surface S2 of the first lens L1 is a concave surface, and the object-side surface S1 and the image-side surface S2 of the first lens L1 are both aspheric surfaces.

The second lens L2 has a positive refractive power, an object-side surface S3 of the second lens L2 is a convex surface, an image-side surface S4 of the second lens L2 is a convex surface, and the object-side surface S3 and the image-side surface S4 of the second lens L2 are both aspheric surfaces.

The third lens L3 has a positive refractive power, an object-side surface S5 of the third lens L3 is a convex surface, an image-side surface S6 of the third lens L3 is a convex surface, and the object-side surface S5 and the image-side surface S6 of the third lens L3 are both aspheric surfaces.

The fourth lens L4 has a negative refractive power, an object-side surface S7 of the fourth lens L4 is a convex surface, an image-side surface S8 of the fourth lens L4 is a concave surface, and the object-side surface S7 and the image-side surface S8 of the fourth lens L4 are both aspheric surfaces.

Alternatively, the camera lens assembly may further include an optical filter L5 having an object-side surface S9 and an image-side surface S10. Light from an object passes through the surfaces S1 to S10 sequentially and is finally imaged on the image plane S11.

Alternatively, an diaphragm STO may also be disposed between the first lens L1 and the second lens L2 to improve the imaging quality.

Table 4 shows the surface type, the radius of curvature, the thickness, the material and the conic coefficient of each lens of the camera lens assembly in Embodiment 2. The radius of curvature and the thickness are shown in millimeters (mm). Table 5 shows the high-order coefficients applicable to each aspheric surface in Embodiment 2. The surface type of each aspheric surface may be defined by the formula (1) given in the above Embodiment 1. Table 6 shows the total effective focal length f of the camera lens assembly, the effective focal lengths f1-f4 of the lenses, the total track length TTL of the camera lens assembly and the half of the diagonal length ImgH of the effective pixel area on the image plane S11 of the camera lens assembly in Embodiment 2.

TABLE 6

| parameter | f (mm) | f1 (mm) | f2 (mm) | f3 (mm) | f4 (mm) | TTL (mm) | ImgH (mm) |
|---|---|---|---|---|---|---|---|
| numerical value | 1.95 | −4.22 | 35.79 | 2.76 | −12.46 | 9.49 | 2.47 |

Figure 4A:
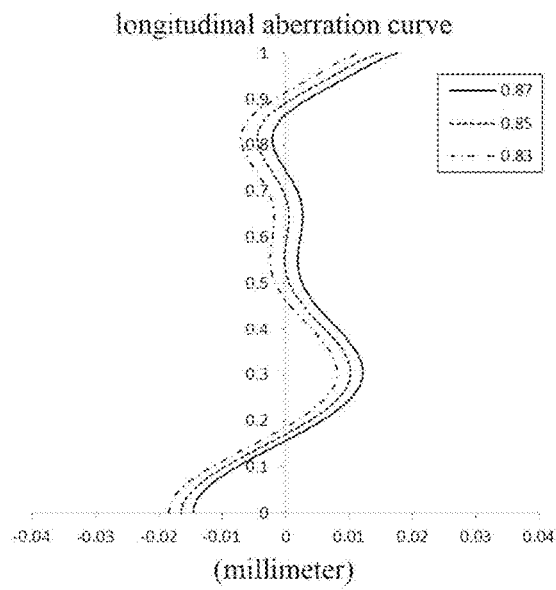
FIGS. 4A-4D respectively illustrate a longitudinal aberration curve, an astigmatic curve, a lateral color curve, and a relative illumination curve of the camera lens assembly according to Embodiment 2.
Figure 4B:
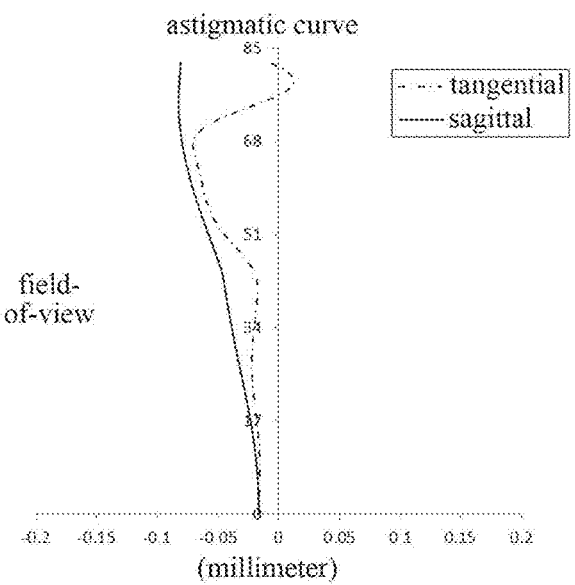
Figure 4C:
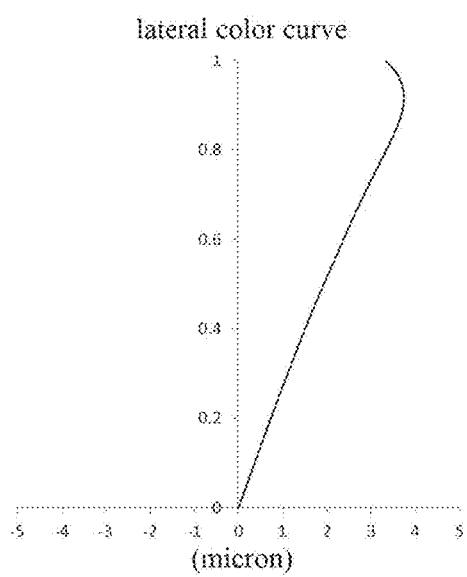
Figure 4D:
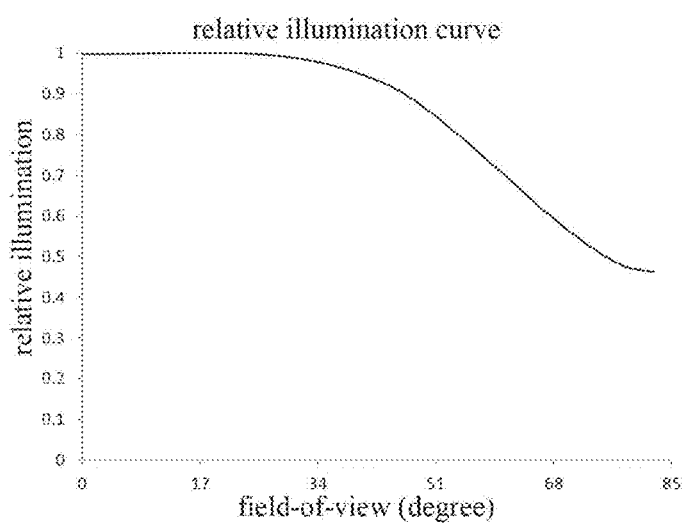

FIG. 4A shows the longitudinal aberration curve of the camera lens assembly according to Embodiment 2, representing deviations of focal points of light of different wavelengths converged after passing through the lens assembly. FIG. 4B shows the astigmatic curve of the camera lens assembly according to Embodiment 2, representing a curvature of the tangential image plane and a curvature of the sagittal image plane. FIG. 4C shows the lateral color curve of the camera lens assembly according to Embodiment 2, representing deviations of different image heights on the image plane after light passes through the lens assembly. FIG. 4D shows the relative illumination curve of the camera lens assembly according to Embodiment 2, representing the relative illuminations corresponding to different field-of-views. It can be seen from FIG. 4A to FIG. 4D that the camera lens assembly given in Embodiment 2 can achieve a good imaging quality.

Embodiment 3

Figure 5:
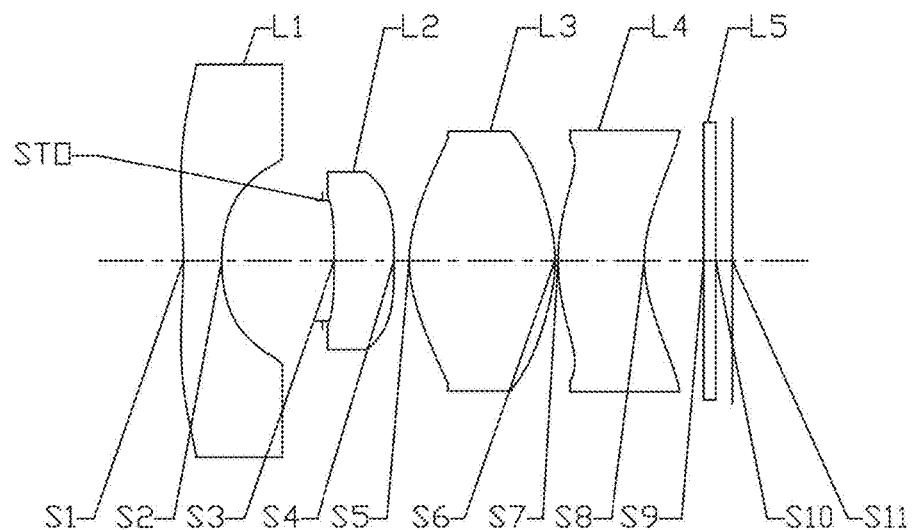
FIG. 5 is a schematic structural diagram illustrating a camera lens assembly according to Embodiment 3 of the present disclosure.

A camera lens assembly according to Embodiment 3 of the present disclosure is described below with reference to FIGS. 5-6D. FIG. 5 is a schematic structural diagram illustrating the camera lens assembly according to Embodiment 3 of the present disclosure.

As shown in FIG. 5, the camera lens assembly along an optical axis from an object side to an image side sequentially includes a first lens L1, a second lens L2, a third lens L3, a

|  |  |  |  | material | | |
|---|---|---|---|---|---|---|
| surface number | surface type | radius of curvature | thickness | refractive index | abbe number | conic coefficient |
| OBJ | spherical | infinite | infinite |  |  |  |
| S1 | aspheric | −3.4189 | 0.6960 | 1.53 | 55.8 | −14.7344 |
| S2 | aspheric | 6.8106 | 1.5945 |  |  | 8.2020 |
| STO | spherical | infinite | 0.1919 |  |  |  |
| S3 | aspheric | 54.8934 | 1.4696 | 1.53 | 55.8 | −92.1869 |
| S4 | aspheric | −28.4883 | 02675 |  |  | 50.0000 |
| S5 | aspheric | 2.1139 | 2.2562 | 1.53 | 55.8 | −6.5538 |
| S6 | aspheric | −2.9516 | 0.0317 |  |  | −7.8966 |
| S7 | aspheric | 3.9545 | 1.4775 | 1.62 | 23.5 | −1.6366 |
| S8 | aspheric | 2.2413 | 1.0150 |  |  | −3.8760 |
| S9 | spherical | infinite | 0.2100 | 1.52 | 64.2 |  |
| S10 | spherical | infinite | 0.2836 |  |  |  |
| S11 | spherical | infinite |  |  |  |  |

TABLE 5

| surface number | A4 | A6 | A8 | A10 | A12 | A14 | A16 |
|---|---|---|---|---|---|---|---|
| S1 | 2.2289E−02 | −4.2682E−03 | 5.2154E−04 | −3.2167E−05 | −6.5861E−09 | 1.0613E−07 | −3.8767E−09 |
| S2 | 8.3413E−02 | −4.6106E−02 | 6.1582E−02 | −4.9594E−02 | 2.2677E−02 | −5.1310E−03 | 4.3856E−04 |
| S3 | −7.7210E−02 | 2.2969E−01 | −6.3031E−01 | 9.5376E−01 | −8.3010E−01 | 3.8396E−01 | −7.3574E−02 |
| S4 | −1.0983E−01 | 6.3218E−02 | −5.1160E−02 | 2.9146E−02 | −1.0614E−02 | 2.1446E−03 | −1.8642E−04 |
| S5 | 6.3913E−03 | 7.3420E−04 | −1.6498E−03 | 6.9869E−04 | −1.5284E−04 | 1.7182E−05 | −7.5579E−07 |
| S6 | 7.3652E−03 | −4.1759E−03 | 3.8963E−04 | −1.5330E−04 | 6.4190E−05 | −1.0426E−05 | 6.1475E−07 |
| S7 | 2.6001E−05 | −1.1399E−02 | 4.9366E−03 | −1.7443E−03 | 3.3698E−04 | −3.2219E−05 | 1.2035E−06 |
| S8 | −2.1226E−02 | 1.1221E−02 | −3.7164E−03 | 7.4355E−04 | −8.1779E−05 | 3.3695E−06 | 1.1787E−08 | fourth lens L4 and an image plane S11. The camera lens assembly may further include a photosensitive element disposed on the image plane S11.

The first lens L1 has a negative refractive power, an object-side surface S1 of the first lens L1 is a concave surface, an image-side surface S2 of the first lens L1 is a concave surface, and the object-side surface S1 and the image-side surface S2 of the first lens L1 are both aspheric surfaces.

The second lens L2 has a negative refractive power, an object-side surface S3 of the second lens L2 is a concave surface, an image-side surface S4 of the second lens L2 is a convex surface, and the object-side surface S3 and the image-side surface S4 of the second lens L2 are both aspheric surfaces.

The third lens L3 has a positive refractive power, an object-side surface S5 of the third lens L3 is a convex surface, an image-side surface S6 of the third lens L3 is a convex surface, and the object-side surface S5 and the image-side surface S6 of the third lens L3 are both aspheric surfaces.

The fourth lens L4 has a negative refractive power, an object-side surface S7 of the fourth lens L4 is a convex surface, an image-side surface S8 of the fourth lens L4 is a concave surface, and the object-side surface S7 and the image-side surface S8 of the fourth lens L4 are both aspheric surfaces.

Alternatively, the camera lens assembly may further include an optical filter L5 having an object-side surface S9 and an image-side surface S10. Light from an object passes through the surfaces S1 to S10 sequentially and is finally imaged on the image plane S11.

Alternatively, an diaphragm STO may also be disposed between the first lens L1 and the second lens L2 to improve the imaging quality.

Table 7 shows the surface type, the radius of curvature, the thickness, the material and the conic coefficient of each lens of the camera lens assembly in Embodiment 3. The radius of curvature and the thickness are shown in millimeters (mm). Table 8 shows the high-order coefficients applicable to each aspheric surface in Embodiment 3. The surface type of each aspheric surface may be defined by the formula (1) given in the above Embodiment 1. Table 9 shows the total effective focal length f of the camera lens assembly, the effective focal lengths f1-f4 of the lenses, the total track length TTL of the camera lens assembly and the half of the diagonal length ImgH of the effective pixel area on the image plane S11 of the camera lens assembly in Embodiment 3.

TABLE 7

| surface number | surface type | radius of curvature | thickness | material refractive index | abbe number | conic coefficient |
|---|---|---|---|---|---|---|
| OBJ | spherical | infinite | infinite | | | |
| S1 | aspheric | −9.4859 | 0.6570 | 1.53 | 55.8 | −12.7487 |
| S2 | aspheric | 3.1092 | 1.7308 | | | 1.7097 |
| STO | spherical | infinite | 0.2084 | | | |
| S3 | aspheric | −27.4507 | 1.0260 | 1.53 | 55.8 | 50.0000 |
| S4 | aspheric | −35.9787 | 0.2610 | | | 50.0000 |
| S5 | aspheric | 2.1292 | 2.5003 | 1.53 | 55.8 | −6.3418 |
| 56 | aspheric | −2.4823 | 0.0521 | | | −6.7217 |
| S7 | aspheric | 3.7043 | 1.4878 | 1.62 | 23.5 | −1.3106 |
| S8 | aspheric | 2.1365 | 1.0154 | | | −4.2235 |
| S9 | spherical | infinite | 0.2100 | 1.52 | 64.2 | |
| S10 | spherical | infinite | 0.2840 | | | |
| S11 | spherical | infinite | | | | |

TABLE 8

| surface number | A4 | A6 | A8 | A10 | A12 | A14 | A16 |
|---|---|---|---|---|---|---|---|
| S1 | 2.1698E−02 | −4.8541E−03 | 8.0127E−04 | −8.3661E−05 | 4.8322E−06 | −1.2574E−07 | 6.0448E−10 |
| S2 | 5.4816E−02 | −4.6444E−02 | 6.1798E−02 | −4.9551E−02 | 2.2696E−02 | −5.1364E−03 | 4.2446E−04 |
| S3 | −6.3615E−02 | 1.1774E−01 | −3.1590E−01 | 4.3047E−01 | −3.3423E−01 | 1.3046E−01 | 1.9150E−02 |
| S4 | −1.0435E−01 | 4.3045E−02 | −2.6015E−02 | 4.6346E−03 | 3.1642E−03 | −2.0783E−03 | 3.5438E−04 |
| S5 | 6.3587E−03 | 2.1999E−03 | −2.5964E−03 | 1.0024E−03 | −2.1783E−04 | 2.6311E−05 | −1.2972E−06 |
| S6 | 2.8861E−03 | −6.1943E−03 | 6.0177E−03 | 3.2723E−03 | 8.4682E−04 | −1.0625E−04 | 5.3215E−06 |
| S7 | 7.3554E−03 | −1.4720E−02 | 6.8602E−03 | −1.9286E−03 | 1.3716E−04 | 2.3243E−05 | −2.8750E−06 |
| S8 | −1.4432E−02 | 1.6791E−03 | 4.2821E−03 | −2.7722E−03 | 7.1596E−04 | −8.6196E−05 | 3.9515E−06 |

TABLE 9

| parameter | f (mm) | f1 (mm) | f2 (mm) | f3 (mm) | f4 (mm) | TTL (mm) | ImgH (mm) |
|---|---|---|---|---|---|---|---|
| numerical value | 1.97 | −4.36 | −229.15 | 23.67 | −12.79 | 9.43 | 2.46 |

Figures 6A, 6B:
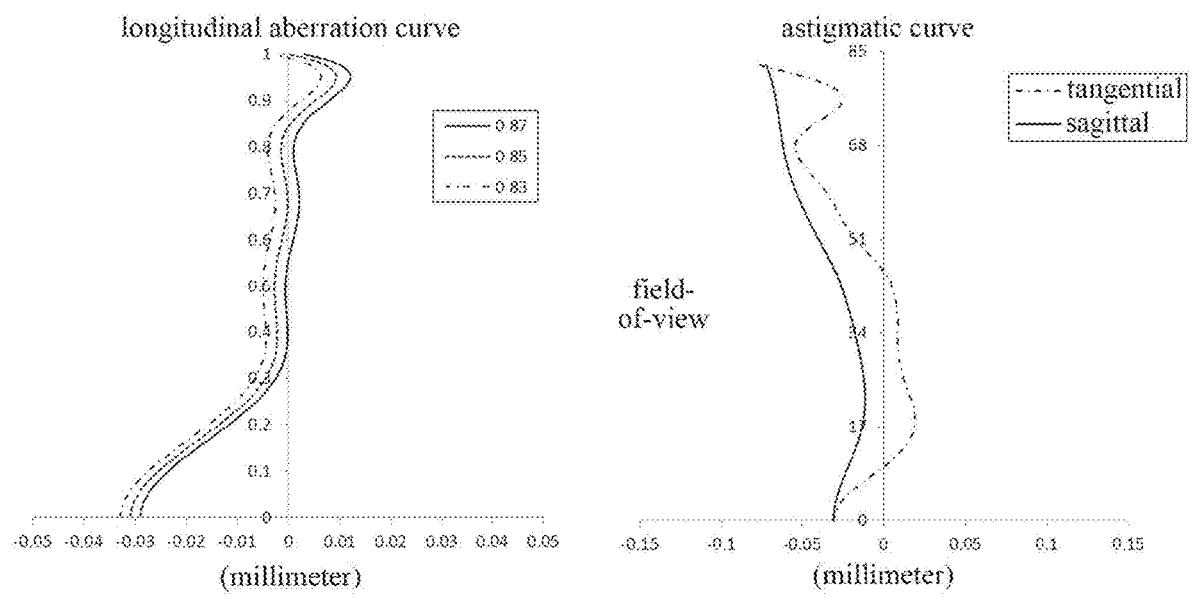

FIG. 6A shows the longitudinal aberration curve of the camera lens assembly according to Embodiment 3, representing deviations of focal points of light of different wavelengths converged after passing through the lens assembly. FIG. 6B shows the astigmatic curve of the camera lens assembly according to Embodiment 3, representing a curvature of the tangential image plane and a curvature of the sagittal image plane. FIG. 6C shows the lateral color curve of the camera lens assembly according to Embodiment 3, representing deviations of different image heights on the image plane after light passes through the lens assembly. FIG. 6D shows the relative illumination curve of the camera lens assembly according to Embodiment 3, representing the relative illuminations corresponding to different field-of-views. It can be seen from FIG. 6A to FIG. 6D that the camera lens assembly given in Embodiment 3 can achieve a good imaging quality.

Embodiment 4

A camera lens assembly according to Embodiment 4 of the present disclosure is described below with reference to FIGS. 7-8D. FIG. 7 is a schematic structural diagram illustrating the camera lens assembly according to Embodiment 4 of the present disclosure.

As shown in FIG. 7, the camera lens assembly along an optical axis from an object side to an image side sequentially includes a first lens L1, a second lens L2, a third lens L3, a fourth lens L4 and an image plane S11. The camera lens assembly may further include a photosensitive element disposed on the image plane S11.

The first lens L1 has a negative refractive power, an object-side surface S1 of the first lens L1 is a convex surface, an image-side surface S2 of the first lens L1 is a concave surface, and the object-side surface S1 and the image-side surface S2 of the first lens L1 are both aspheric surfaces.

The second lens L2 has a positive refractive power, an object-side surface S3 of the second lens L2 is a convex surface, an image-side surface S4 of the second lens L2 is a convex surface, and the object-side surface S3 and the image-side surface S4 of the second lens L2 are both aspheric surfaces.

The third lens L3 has a positive refractive power, an object-side surface S5 of the third lens L3 is a convex surface, an image-side surface S6 of the third lens L3 is a convex surface, and the object-side surface S5 and the image-side surface S6 of the third lens L3 are both aspheric surfaces.

The fourth lens L4 has a negative refractive power, an object-side surface S7 of the fourth lens L4 is a convex surface, an image-side surface S8 of the fourth lens L4 is a concave surface, and the object-side surface S7 and the image-side surface S8 of the fourth lens L4 are both aspheric surfaces.

Alternatively, the camera lens assembly may further include an optical filter L5 having an object-side surface S9 and an image-side surface S10. Light from an object passes through the surfaces S1 to S10 sequentially and is finally imaged on the image plane S11.

Alternatively, an diaphragm STO may also be disposed between the first lens L1 and the second lens L2 to improve the imaging quality.

Table 10 shows the surface type, the radius of curvature, the thickness, the material and the conic coefficient of each lens of the camera lens assembly in Embodiment 4. The radius of curvature and the thickness are shown in millimeters (mm). Table 11 shows the high-order coefficients applicable to each aspheric surface in Embodiment 4. The surface type of each aspheric surface may be defined by the formula (1) given in the above Embodiment 1. Table 12 shows the total effective focal length f of the camera lens assembly, the effective focal lengths f1-f4 of the lenses, the total track length TTL of the camera lens assembly and the half of the diagonal length imgH of the effective pixel area on the image plane S11 of the camera lens assembly in Embodiment 4.

TABLE 10

| surface number | surface type | radius of curvature | thickness | material refractive index | abbe number | conic coefficient |
|---|---|---|---|---|---|---|
| OBJ | spherical | infinite | infinite | | | |
| S1 | aspheric | 14.8851 | 0.8993 | 1.62 | 23.5 | −99.0000 |
| S2 | aspheric | 1.8146 | 1.6293 | | | 0.0431 |
| STO | spherical | infinite | 0.1508 | | | |
| S3 | aspheric | 38.6686 | 1.2725 | 1.53 | 55.8 | 15.5650 |
| S4 | aspheric | −282.4288 | 0.2844 | | | −99.0000 |
| S5 | aspheric | 1.9004 | 2.2668 | 1.53 | 55.8 | −7.0978 |
| S6 | aspheric | −3.4747 | 0.0300 | | | −7.2391 |
| S7 | aspheric | 3.0552 | 1.5692 | 1.53 | 55.8 | −2.6320 |
| S8 | aspheric | 2.3756 | 0.9689 | | | −4.0556 |
| S9 | spherical | infinite | 0.2100 | 1.52 | 64.2 | |
| S10 | spherical | infinite | 0.2376 | | | |
| S11 | spherical | infinite | | | | |

TABLE 11

| surface number | A4 | A6 | A8 | A10 | A12 | A14 | A16 |
|---|---|---|---|---|---|---|---|
| S1 | 5.3925E−03 | 1.3960E−04 | −2.1237E−04 | 4.3406E−05 | −4.3647E−06 | 2.2423E−07 | −4.7155E−09 |
| S2 | −6.3116E−04 | 2.9146E−02 | −4.7154E−02 | 4.8565E−02 | −2.8868E−02 | 9.0888E−03 | −1.1811E−03 |
| S3 | −1.0530E−01 | 3.6547E−01 | −1.1996E+00 | 2.1243E+00 | −2.1431E+00 | 1.1400E+00 | −2.4991E−01 |
| S4 | −1.5961E−01 | 1.1440E−01 | −1.1717E−01 | 8.3431E−02 | −3.8259E−02 | 9.8471E−03 | −1.0958E−03 |
| S5 | 1.2268E−02 | −9.1803E−03 | 3.7129E−03 | −1.5761E−03 | 4.4957E−04 | −6.1599E−05 | 3.1724E−06 |
| S6 | 5.0505E−03 | −2.7187E−03 | −3.7048E−03 | 1.8038E−03 | −3.6432E−04 | 3.8496E−05 | −1.7088E−06 |
| S7 | −1.2627E−04 | −1.0610E−02 | 3.1536E−03 | −2.0136E−03 | 6.3007E−64 | −6.8055E−05 | 9.4689E−07 |
| S8 | 1.9575E−03 | 7.6049E−04 | −1.7800E−03 | 2.6516E−05 | 1.5704E−04 | −3.2119E−05 | 1.8879E−06 |

TABLE 12

| parameter | f (mm) | f1 (mm) | f2 (mm) | f3 (mm) | f4 (mm) | TTL (mm) | ImgH (mm) |
|---|---|---|---|---|---|---|---|
| numerical value | 1.85 | −3.43 | 64.59 | 2.73 | −99.84 | 9.52 | 2.46 |

FIG. 8A shows the longitudinal aberration curve of the camera lens assembly according to Embodiment 4, representing deviations of focal points of light of different wavelengths converged after passing through the lens assembly. FIG. 8B shows the astigmatic curve of the camera lens assembly according to Embodiment 4, representing a curvature of the tangential image plane and a curvature of the sagittal image plane. FIG. 8C shows the lateral color curve of the camera lens assembly according to Embodiment 4, representing deviations of different image heights on the image plane after light passes through the lens assembly. FIG. 8D shows the relative illumination curve of the camera lens assembly according to Embodiment 4, representing the relative illuminations corresponding to different field-of-views. It can be seen from FIG. 8A to FIG. 8D that the camera lens assembly given in Embodiment 4 can achieve a good imaging quality.

Embodiment 5

Figure 9:
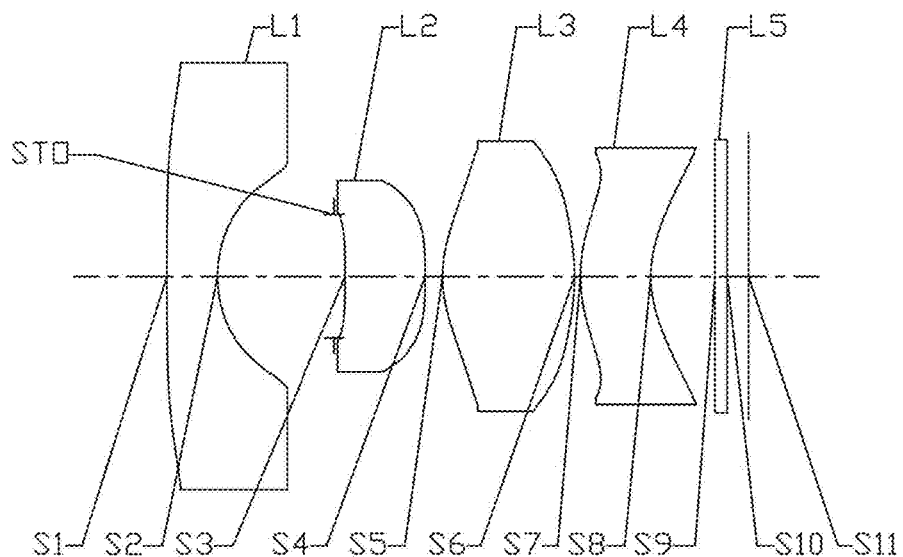
FIG. 9 is a schematic structural diagram illustrating a camera lens assembly according to Embodiment 5 of the present disclosure.

A camera lens assembly according to Embodiment 5 of the present disclosure is described below with reference to FIGS. 9-10D. FIG. 9 is a schematic structural diagram illustrating the camera lens assembly according to Embodiment 5 of the present disclosure.

As shown in FIG. 9, the camera lens assembly along an optical axis from an object side to an image side sequentially includes a first lens L1, a second lens L2, a third lens L3, a fourth lens L4 and an image plane S11. The camera lens assembly may further include a photosensitive element disposed on the image plane S11.

The first lens L1 has a negative refractive power, an object-side surface S1 of the first lens L1 is a convex surface, an image-side surface S2 of the first lens L1 is a concave surface, and the object-side surface S1 and the image-side surface S2 of the first lens L1 are both aspheric surfaces.

The second lens L2 has a positive refractive power, an object-side surface S3 of the second lens L2 is a concave surface, an image-side surface S4 of the second lens L2 is a convex surface, and the object-side surface S3 and the image-side surface S4 of the second lens L2 are both aspheric surfaces.

The third lens L3 has a positive refractive power, an object-side surface S5 of the third lens L3 is a convex surface, an image-side surface S6 of the third lens L3 is a convex surface, and the object-side surface S5 and the image-side surface S6 of the third lens L3 are both aspheric surfaces.

The fourth lens L4 has a negative refractive power, an object-side surface S7 of the fourth lens L4 is a convex surface, an image-side surface S8 of the fourth lens L4 is a concave surface, and the object-side surface S7 and the image-side surface S8 of the fourth lens L4 are both aspheric surfaces.

Alternatively, the camera lens assembly may further include an optical filter L5 having an object-side surface S9 and an image-side surface S10. Light from an object passes through the surfaces S1 to S10 sequentially and is finally imaged on the image plane S11.

Alternatively, an diaphragm STO may also be disposed between the first lens L1 and the second lens L2 to improve the imaging quality.

Table 13 shows the surface type, the radius of curvature, the thickness, the material and the conic coefficient of each lens of the camera lens assembly in Embodiment 5. The radius of curvature and the thickness are shown in millimeters (mm). Table 14 shows the high-order coefficients applicable to each aspheric surface in Embodiment 5. The surface type of each aspheric surface may be defined by the formula (1) given in the above Embodiment 1. Table 15 shows the total effective focal length f of the camera lens assembly, the effective focal lengths f1-f4 of the lenses, the total track length TTL of the camera lens assembly and the half of the diagonal length imgH of the effective pixel area on the image plane S11 of the camera lens assembly in Embodiment 5.

TABLE 13

| surface number | surface type | radius of curvature | thickness | material refractive index | abbe number | conic coefficient |
|---|---|---|---|---|---|---|
| OBJ | spherical | infinite | infinite | | | |
| S1 | aspheric | 128.3093 | 0.8653 | 1.53 | 55.8 | −83.9272 |
| S2 | aspheric | 2.1592 | 2.0038 | | | −0.0463 |
| STO | spherical | infinite | 0.1867 | | | |
| S3 | aspheric | −42.4118 | 1.3706 | 1.53 | 55.8 | 3.5736 |
| S4 | aspheric | −18.2626 | 0.2964 | | | 3.8171 |
| S5 | aspheric | 2.0566 | 2.2577 | 1.53 | 55.8 | −6.8587 |
| S6 | aspheric | −3.7847 | 0.1022 | | | −7.8133 |
| S7 | aspheric | 2.6725 | 1.2122 | 1.53 | 55.8 | −4.1392 |
| S8 | aspheric | 1.9247 | 1.0971 | | | −3.2205 |
| S9 | spherical | infinite | 0.2100 | 1.52 | 64.2 | |
| S10 | spherical | infinite | 0.3656 | | | |
| S11 | spherical | infinite | | | | |

TABLE 14

| surface number | A4 | A6 | A8 | A10 | A12 | A14 | A16 |
|---|---|---|---|---|---|---|---|
| S1 | −1.0277E−03 | 1.0340E−03 | −1.8854E−04 | 2.0869E−05 | −1.5550E−06 | 6.8757E−08 | −1.3367E−09 |
| S2 | 9.8270E−03 | −6.4562E−03 | 1.6088E−02 | −1.5921E−02 | 8.6036E−03 | −2.2033E−03 | 2.0226E−04 |
| S3 | −8.1077E−02 | 1.8121E−01 | −5.3670E−01 | 8.3458E−01 | −7.4776E−01 | 3.5272E−01 | −6.8991E−02 |
| S4 | −1.2537E−01 | 6.0163E−02 | −4.8634E−02 | 2.8096E−02 | −1.0745E−02 | 2.3279E−03 | −2.2897E−04 |
| S5 | 8.7750E−03 | −5.0349E−03 | 5.7102E−04 | 1.0257E−04 | −3.9006E−05 | 5.6437E−06 | −3.1403E−07 |
| S6 | 1.2807E−02 | 7.1405E−04 | −6.1339E−03 | 2.3784E−03 | −4.2500E−04 | 3.8367E−05 | −1.3895E−06 |
| S7 | 5.4401E−03 | −2.1023E−03 | −1.5574E−03 | 2.2154E−04 | −3.7992E−05 | 1.4180E−05 | −1.5628E−06 |
| S8 | −2.2705E−02 | 1.9522E−02 | −8.2727E−03 | 1.9307E−03 | −2.4535E−04 | 1.3960E−05 | −1.9352E−07 |

TABLE 15

| parameter | f (mm) | f1 (mm) | f2 (mm) | f3 (mm) | f4 (mm) | TTL (mm) | ImgH (mm) |
|---|---|---|---|---|---|---|---|
| numerical value | 1.96 | −4.17 | 59.66 | 2.92 | −29.62 | 9.97 | 2.46 |

Figure 10A:
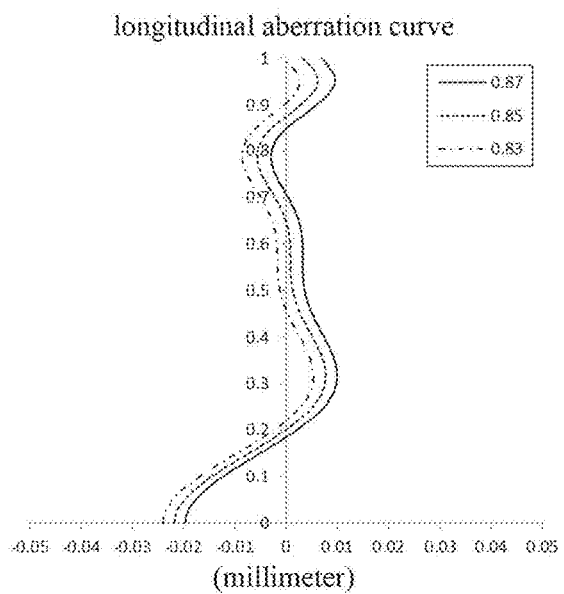
Figure 10B:
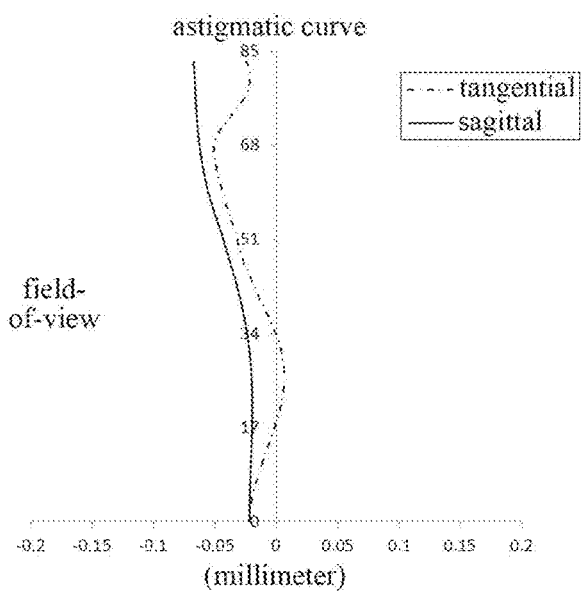

FIG. 10A shows the longitudinal aberration curve of the camera lens assembly according to Embodiment 5, representing deviations of focal points of light of different wavelengths converged after passing through the lens assembly. FIG. 10B shows the astigmatic curve of the camera lens assembly according to Embodiment 5, representing a curvature of the tangential image plane and a curvature of the sagittal image plane. FIG. 10C shows the lateral color curve of the camera lens assembly according to Embodiment 5, representing deviations of different image heights on the image plane after light passes through the lens assembly. FIG. 10D shows the relative illumination curve of the camera lens assembly according to Embodiment 5, representing the relative illuminations corresponding to different field-of-views. It can be seen from FIG. 10A to FIG. 10D that the camera lens assembly given in Embodiment 5 can achieve a good imaging quality.

Embodiment 6

Figure 11:
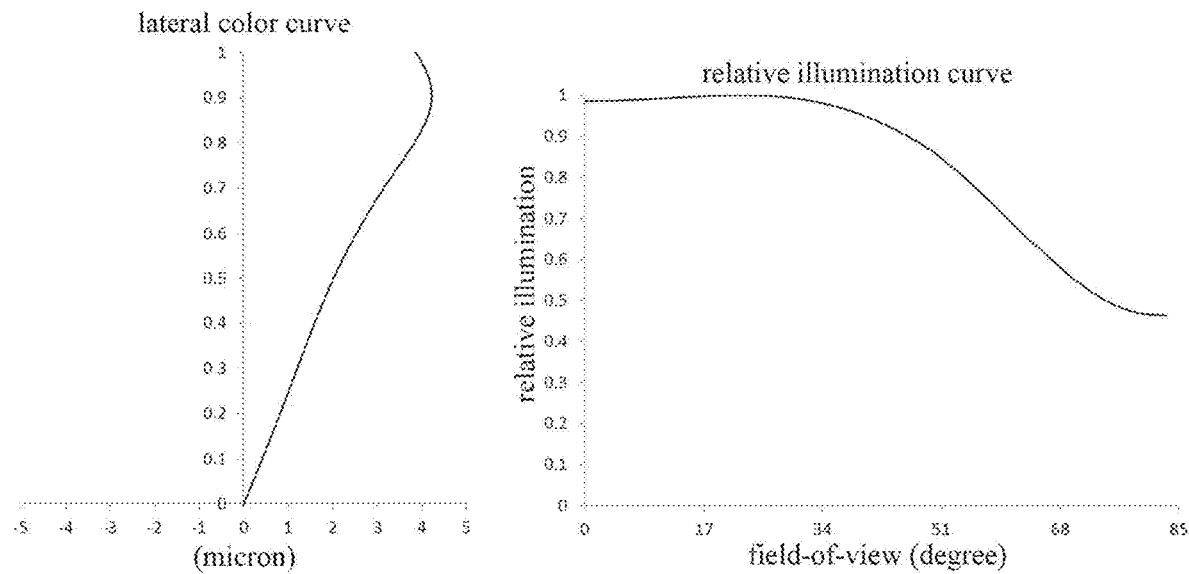
FIG. 11 is a schematic structural diagram illustrating a camera lens assembly according to Embodiment 6 of the present disclosure.
Figure 11:
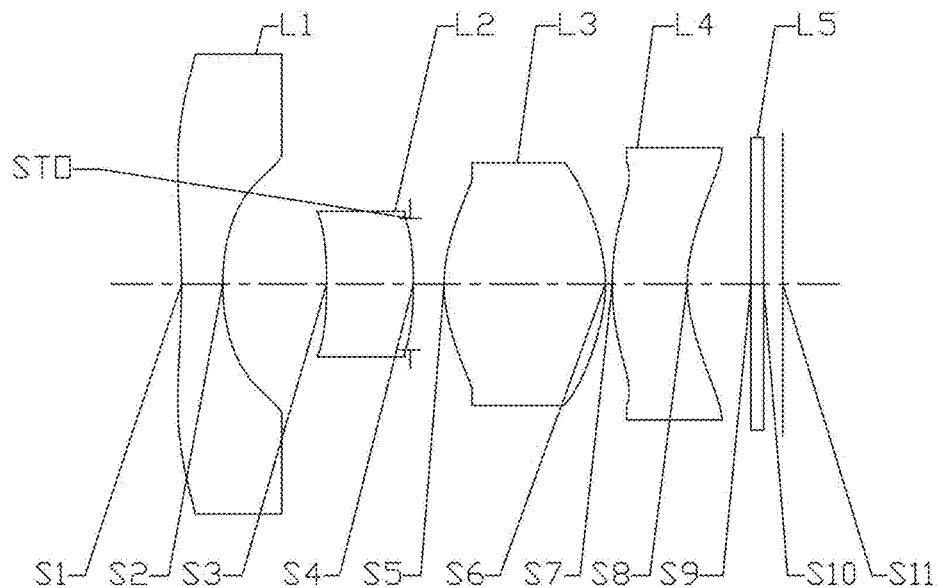

A camera lens assembly according to Embodiment 6 of the present disclosure is described below with reference to FIGS. 11-12D. FIG. 11 is a schematic structural diagram illustrating the camera lens assembly according to Embodiment 6 of the present disclosure.

As shown in FIG. 11, the camera lens assembly along an optical axis from an object side to an image side sequentially includes a first lens L1, a second lens L2, a third lens L3, a fourth lens L4 and an image plane S11. The camera lens assembly may further include a photosensitive element disposed on the image plane S11.

The first lens L1 has a negative refractive power, an object-side surface S1 of the first lens L1 is a concave surface, an image-side surface S2 of the first lens L1 is a concave surface, and the object-side surface S1 and the image-side surface S2 of the first lens L1 are both aspheric surfaces.

The second lens L2 has a positive refractive power, an object-side surface S3 of the second lens L2 is a concave surface, an image-side surface S4 of the second lens L2 is a convex surface, and the object-side surface S3 and the image-side surface S4 of the second lens L2 are both aspheric surfaces.

The third lens L3 has a positive refractive power, an object-side surface S5 of the third lens L3 is a convex surface, an image-side surface S6 of the third lens L3 is a convex surface, and the object-side surface S5 and the image-side surface S6 of the third lens L3 are both aspheric surfaces.

The fourth lens L4 has a negative refractive power, an object-side surface S7 of the fourth lens L4 is a convex surface, an image-side surface S8 of the fourth lens L4 is a concave surface, and the object-side surface S7 and the image-side surface S8 of the fourth lens L4 are both aspheric surfaces.

Alternatively, the camera lens assembly may further include an optical filter L5 having an object-side surface S9 and an image-side surface S10. Light from an object passes through the surfaces S1 to S10 sequentially and is finally imaged on the image plane S11.

Alternatively, a diaphragm STO may also be disposed between the first lens L1 and the second lens L2 to improve the imaging quality.

Table 16 shows the surface type, the radius of curvature, the thickness, the material and the conic coefficient of each lens of the camera lens assembly in Embodiment 6. The radius of curvature and the thickness are shown in millimeters (mm). Table 17 shows the high-order coefficients applicable to each aspheric surface in Embodiment 6. The surface type of each aspheric surface may be defined by the formula (1) given in the above Embodiment 1. Table 18 shows the total effective focal length f of the camera lens assembly, the effective focal lengths f1-f4 of the lenses, the total track length TTL of the camera lens assembly and the half of the diagonal length imgH of the effective pixel area on the image plane S11 of the camera lens assembly in Embodiment 6.

TABLE 16

| surface number | surface type | radius of curvature | thickness | material refractive index | material abbe number | conic coefficient |
|---|---|---|---|---|---|---|
| OBJ | spherical | infinite | infinite | | | |
| S1 | aspheric | −15.8087 | 0.6776 | 1.53 | 55.8 | −88.6836 |
| S2 | aspheric | 3.6328 | 1.7074 | | | 1.6141 |
| S3 | aspheric | −10.9545 | 1.4360 | 1.53 | 55.8 | −82.6383 |
| S4 | aspheric | −9.6499 | −0.0504 | | | −99.0000 |

TABLE 16-continued

| surface number | surface type | radius of curvature | thickness | material refractive index | abbe number | conic coefficient |
|---|---|---|---|---|---|---|
| STO | spherical | infinite | 0.5560 | | | |
| S5 | aspheric | 2.3254 | 2.6534 | 1.53 | 55.8 | −6.2513 |
| S6 | aspheric | −2.4303 | 0.1110 | | | −4.1352 |
| S7 | aspheric | 4.2858 | 1.2444 | 1.53 | 55.8 | −3.6137 |
| S8 | aspheric | 2.2611 | 1.0456 | | | −3.7379 |
| S9 | spherical | infinite | 0.2100 | 1.52 | 64.2 | |
| S10 | spherical | infinite | 0.3133 | | | |
| S11 | spherical | infinite | | | | |

TABLE 17

| surface number | A4 | A6 | A8 | A10 | A12 | A14 | A16 |
|---|---|---|---|---|---|---|---|
| S1 | 5.6978E−04 | 7.2309E−04 | −6.0919E−05 | −2.1697E−06 | 5.7290E−07 | −3.0350E−08 | 5.2109E−10 |
| S2 | 7.3832E−03 | −4.0088E−03 | 8.2558E−03 | −6.7521E−03 | 3.0155E−03 | −6.3822E−04 | 4.8420E−05 |
| S3 | −6.5538E−02 | 1.0545E−01 | −2.6451E−01 | 3.5357E−01 | −2.6208E−01 | 1.0217E−01 | −1.6516E−02 |
| S4 | −8.4220E−02 | 3.8830E−02 | −2.5211E−02 | 1.2260E−02 | −3.7662E−03 | 6.7432E−04 | −5.4813E−05 |
| S5 | 1.0285E−02 | −2.4505E−03 | 2.3367E−04 | −1.8493E−05 | −1.3671E−05 | 1.6348E−06 | −7.5176E−08 |
| S6 | 7.2324E−03 | 4.2523E−04 | −2.9665E−03 | 9.6305E−04 | −1.4896E−04 | 1.1113E−05 | −3.3263E−07 |
| S7 | 5.1043E−03 | −9.7129E−04 | −6.2559E−04 | −2.2154E−05 | −1.3330E−05 | 4.1074E−06 | −3.7412E−07 |
| S8 | −2.7525E−02 | 1.6070E−02 | −5.0347E−03 | 8.6001E−04 | −8.6002E−05 | 4.0439E−06 | −4.6328E−08 |

TABLE 18

| parameter | f (mm) | f1 (mm) | f2 (mm) | f3 (mm) | f4 (mm) | TTL (mm) | ImgH (mm) |
|---|---|---|---|---|---|---|---|
| numerical value | 2.11 | −5.54 | 111.36 | 2.79 | −11.52 | 9.90 | 2.47 |

Figure 12A:
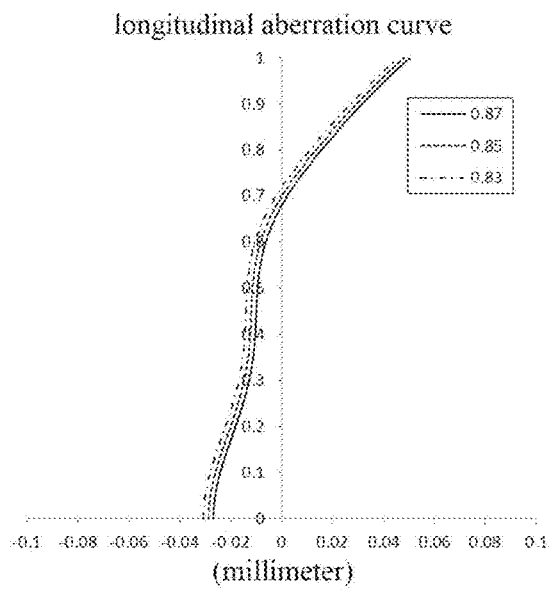
FIGS. 12A-12D respectively illustrate a longitudinal aberration curve, an astigmatic curve, a lateral color curve, and a relative illumination curve of the camera lens assembly according to Embodiment 6.
Figure 12B:
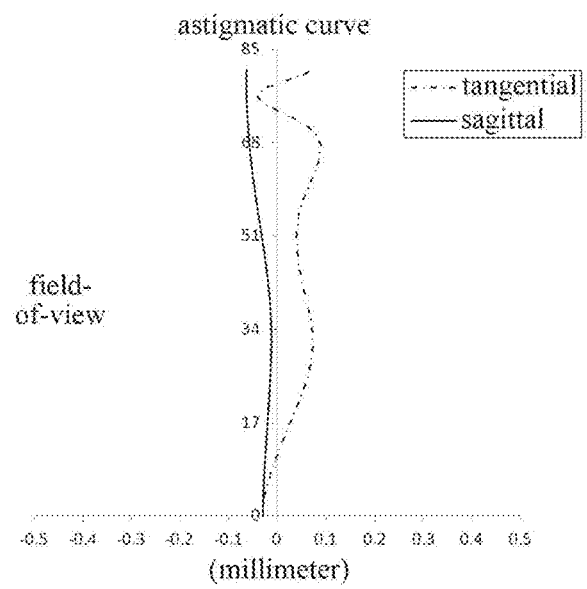
Figure 12C:
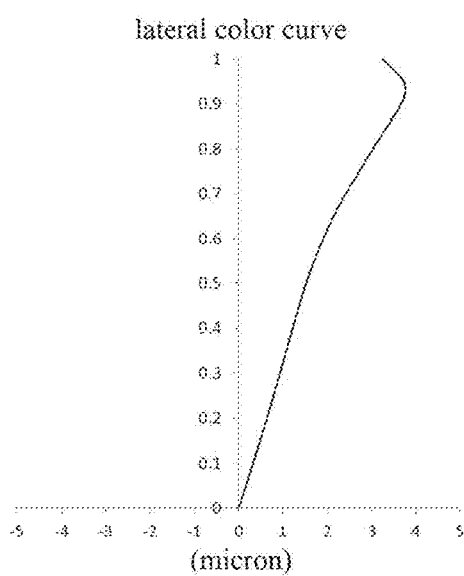
Figure 12D:
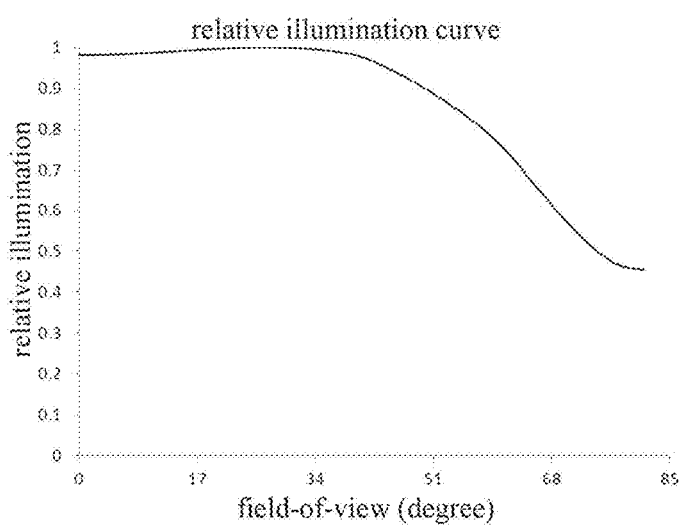

FIG. 12A shows the longitudinal aberration curve of the camera lens assembly according to Embodiment 6, representing deviations of focal points of light of different wavelengths converged after passing through the lens assembly. FIG. 12B shows the astigmatic curve of the camera lens assembly according to Embodiment 6, representing a curvature of the tangential image plane and a curvature of the sagittal image plane. FIG. 12C shows the lateral color curve of the camera lens assembly according to Embodiment 6, representing deviations of different image heights on the image plane after light passes through the lens assembly. FIG. 12D shows the relative illumination curve of the camera lens assembly according to Embodiment 6, representing the relative illuminations corresponding to different field-of-views. It can be seen from FIG. 12A to FIG. 12D that the camera lens assembly given in Embodiment 6 can achieve a good imaging quality.

To sum up, Embodiment 1 to Embodiment 6 respectively satisfy the relationships shown in Table 19 below.

TABLE 19

| Conditional Expression | Embodiment 1 | 2 | 3 | 4 | 5 | 6 |
|---|---|---|---|---|---|---|
| f1/f | −2.11 | −2.16 | −2.21 | −1.86 | −2.14 | −2.62 |
| R5/R8 | 1.03 | 0.94 | 1.00 | 0.80 | 1.07 | 1.03 |
| CT3(CT1 + CT2) | 1.24 | 1.04 | 1.49 | 1.04 | 1.01 | 1.26 |
| DT11/DT42 | 1.43 | 1.55 | 1.50 | 1.42 | 1.66 | 1.69 |
| DT11/ImgH | 1.33 | 1.39 | 1.38 | 1.39 | 1.49 | 1.54 |
| T12/TTL | 0.15 | 0.19 | 0.21 | 0.19 | 0.22 | 0.17 |
| T23*10/TTL | 0.37 | 0.28 | 0.28 | 0.30 | 0.30 | 0.51 |
| DT32/DT41 | 1.33 | 1.07 | 1.08 | 1.05 | 1.11 | 1.00 |
| DT42/ImgH | 0.93 | 0.90 | 0.91 | 0.98 | 0.89 | 0.91 |
| SAG42/CT4 | 0.43 | 0.41 | 0.41 | 0.31 | 0.64 | 0.46 |
| ImgH/f | 1.26 | 1.26 | 1.25 | 1.34 | 1.26 | 1.17 |

The present disclosure further provides a camera device, having a photosensitive element which may be a photosensitive charge-coupled device (CCD) or a complementary metal-oxide semiconductor (CMOS) element. The camera device may be an independent camera device such as a digital camera, or may be a camera module integrated in a mobile electronic device such as a mobile phone and a tablet computer. The camera device is equipped with the camera lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar function.

What is claimed is:

1. A camera lens assembly comprising, sequentially along an optical axis from an object side to an image side, a first lens, a second lens, a third lens, and a fourth lens, wherein the first lens has a negative refractive power;
the third lens has a positive refractive power;
each of the second lens and the fourth lens has a refractive power;
an object-side surface of the third lens is a convex surface, an image-side surface of the fourth lens is a concave surface, and a radius of curvature R5 of the object-side surface of the third lens and a radius of curvature R8 of the image-side surface of the fourth lens satisfy: $0.7<R5/R8<1.2$; and
an effective semi-diameter DT11 of an object-side surface of the first lens and an effective semi-diameter DT42 of the image-side surface of the fourth lens satisfy: $1.3<DT11/DT42<1.8$.

2. The camera lens assembly according to claim 1, wherein an effective focal length f1 of the first lens and a total effective focal length f of the camera lens assembly satisfy: $-3<f1/f<-1.5$.

3. The camera lens assembly according to claim 1, wherein a spacing distance T12 between the first lens and the second lens on the optical axis and a distance TTL from an object-side surface of the first lens to an image plane of the camera lens assembly on the optical axis satisfy: $0.1<T12/TTL<0.3$.

4. The camera lens assembly according to claim 1, wherein a spacing distance T23 between the second lens and the third lens on the optical axis and a distance TTL from an object-side surface of the first lens to an image plane of the camera lens assembly on the optical axis satisfy: $0.1<T23*10/TTL<0.6$.

5. The camera lens assembly according to claim 1, wherein an effective semi-diameter DT11 of an object-side surface of the first lens and half of a diagonal length ImgH of an effective pixel area on an image plane of the camera lens assembly satisfy: $1.2<DT11/ImgH<1.7$.

6. The camera lens assembly according to claim 1, wherein an effective semi-diameter DT32 of an image-side surface of the third lens and an effective semi-diameter DT41 of an object-side surface of the fourth lens satisfy: $0.9<DT32/DT41<1.4$.

7. A camera lens assembly comprising, sequentially along an optical axis from an object side to an image side, a first lens, a second lens, a third lens, and at least one subsequent lens,
wherein at least one of an object-side surface and an image-side surface of the first lens is a concave surface;
at least one of an object-side surface and an image-side surface of the second lens is a convex surface;
each of an object-side surface and an image-side surface of the third lens is a convex surface;
a center thickness CT1 of the first lens on the optical axis, a center thickness CT2 of the second lens on the optical axis and a center thickness CT3 of the third lens on the optical axis satisfy: $0.9<CT3/(CT1+CT2)<1.5$; and
an object-side surface of the third lens is a convex surface, an image-side surface of the fourth lens is a concave surface, and a radius of curvature R5 of the object-side surface of the third lens and a radius of curvature R8 of the image-side surface of the fourth lens satisfy: $0.7<R5/R8<1.2$.

8. The camera lens assembly according to claim 7, wherein the first lens has a negative refractive power, an effective focal length f1 of the first lens and a total effective focal length f of the camera lens assembly satisfy: $-3<f1/f<-1.5$.

9. The camera lens assembly according to claim 7, wherein a spacing distance T12 between the first lens and the second lens on the optical axis and a distance TTL from the object-side surface of the first lens to an image plane of the camera lens assembly on the optical axis satisfy: $0.1<T12/TTL<0.3$.

10. The camera lens assembly according to claim 7, wherein a spacing distance T23 between the second lens and the third lens on the optical axis and a distance TTL from the object-side surface of the first lens to an image plane of the camera lens assembly on the optical axis satisfy: $0.1<T23*10/TTL<0.6$.

11. The camera lens assembly according to claim 7, wherein an effective semi-diameter DT11 of an object-side surface of the first lens and an effective semi-diameter DT42 of the image-side surface of the fourth lens satisfy: $1.3<DT11/DT42<1.8$.

12. The camera lens assembly according to claim 7, wherein the effective semi-diameter DT11 of the object-side surface of the first lens and half of a diagonal length ImgH of an effective pixel area on an image plane of the camera lens assembly satisfy: $1.2<DT11/ImgH<1.7$.

13. The camera lens assembly according to claim 7, wherein an effective semi-diameter DT32 of the image-side surface of the third lens and an effective semi-diameter DT41 of an object-side surface of the fourth lens satisfy: $0.9<DT32/DT41<1.4$.

14. A camera lens assembly comprising, sequentially along an optical axis from an object side to an image side, a first lens, a second lens, a third lens, and a fourth lens,
wherein the first lens has a negative refractive power;
the second lens has a positive refractive power or a negative refractive power
the third lens has a positive refractive power;
the fourth lens has a negative refractive power;
half of a diagonal length ImgH of an effective pixel area on an image plane of the camera lens assembly and a total effective focal length f of the camera lens assembly satisfy: $1<ImgH/f<1.5$; and
an object-side surface of the third lens is a convex surface, an image-side surface of the fourth lens is a concave surface, and a radius of curvature R5 of the object-side surface of the third lens and a radius of curvature R8 of the image-side surface of the fourth lens satisfy: $0.7<R5/R8<1.2$.

15. The camera lens assembly according to claim 14, wherein an effective semi-diameter DT11 of an object-side surface of the first lens and the half of the diagonal length ImgH of the effective pixel area on the image plane of the camera lens assembly satisfy: $1.2<DT11/ImgH<1.7$.

16. The camera lens assembly according to claim 14, wherein an effective semi-diameter DT11 of the object-side surface of the first lens and an effective semi-diameter DT42 of the image-side surface of the fourth lens satisfy: $1.3<DT11/DT42<1.8$.

17. The camera lens assembly according to claim 14, wherein the first lens has the negative refractive power, and an effective focal length f1 of the first lens and the total effective focal length f of the camera lens assembly satisfy: $-3<f1/f<-1.5$.

18. The camera lens assembly according to claim 14, wherein a spacing distance T12 between the first lens and the second lens on the optical axis and a distance TTL from an object-side surface of the first lens to the image plane of the camera lens assembly on the optical axis satisfy: $0.1<T12/TTL<0.3$.

19. The camera lens assembly according to claim 18, wherein a spacing distance T23 between the second lens and the third lens on the optical axis and the distance TTL from the object-side surface of the first lens to the image plane of the camera lens assembly on the optical axis satisfy: $0.1<T23*10/TTL<0.6$.

\* \* \* \* \*